(12) United States Patent
Erickson et al.

(10) Patent No.: US 12,529,417 B2
(45) Date of Patent: Jan. 20, 2026

(54) DRIVETRAIN COMPONENT

(71) Applicant: Means Industries, Inc., Saginaw, MI (US)

(72) Inventors: John P. Erickson, Burton, MI (US); Earl A. Getchel, Midland, MI (US); Conner S. Jurs, Midland, MI (US)

(73) Assignee: Means Industries, Inc., Saginaw, MI (US)

( * ) Notice: Subject to any disclaimer, the term of this patent is extended or adjusted under 35 U.S.C. 154(b) by 0 days.

(21) Appl. No.: 18/824,374

(22) Filed: Sep. 4, 2024

(65) Prior Publication Data

US 2024/0426371 A1 Dec. 26, 2024

Related U.S. Application Data

(60) Division of application No. 17/994,310, filed on Nov. 26, 2022, now Pat. No. 12,117,072, which is a continuation-in-part of application No. 17/886,302, filed on Aug. 11, 2022, now Pat. No. 11,892,065.

(60) Provisional application No. 63/233,826, filed on Aug. 17, 2021.

(51) Int. Cl.
| | |
|---|---|
| *F16H 48/08* | (2006.01) |
| *F16D 41/12* | (2006.01) |
| *F16D 41/14* | (2006.01) |
| *F16D 41/16* | (2006.01) |
| *F16H 48/20* | (2012.01) |
| *F16H 48/34* | (2012.01) |
| *F16H 48/40* | (2012.01) |

(52) U.S. Cl.
CPC ............ *F16H 48/08* (2013.01); *F16D 41/125* (2013.01); *F16D 41/14* (2013.01); *F16D 41/16* (2013.01); *F16H 2048/202* (2013.01); *F16H 2048/346* (2013.01); *F16H 48/40* (2013.01)

(58) Field of Classification Search
None
See application file for complete search history.

(56) References Cited

U.S. PATENT DOCUMENTS

| | | | | |
|---|---|---|---|---|
| 7,484,605 | B2 * | 2/2009 | Pawley | F16D 41/125 192/43.1 |
| 8,051,959 | B2 * | 11/2011 | Eisengruber | F16D 41/125 192/43.1 |
| 10,710,462 | B2 * | 7/2020 | Yamaguchi | B60L 15/2036 |
| 11,536,325 | B2 * | 12/2022 | Jörgensson | B60K 17/165 |
| 12,092,172 | B2 * | 9/2024 | Finn | F16D 41/14 |

(Continued)

FOREIGN PATENT DOCUMENTS

JP 2009079774 A * 4/2009 ............. F16D 41/12

*Primary Examiner* — James J Taylor, II
(74) *Attorney, Agent, or Firm* — Burgess Law Office, PLLC

(57) ABSTRACT

A drivetrain component provides an electronically controlled, overrunning drivetrain disconnect, such as a differential with different operating modes. The drivetrain component includes a coupling member and a rotatable member rotating about the central axis. A first locking structure selectively mechanically couples the coupling member to the rotatable member, and a second locking structure selectively mechanically couples the coupling member to the rotatable member. The first locking structure engages a locking abutment of the rotatable member, and the second locking structure engages a locking abutment of the rotatable member.

13 Claims, 15 Drawing Sheets

(56) References Cited

U.S. PATENT DOCUMENTS

2020/0109749 A1\* 4/2020 Thomas ................ F16D 41/125
2023/0272846 A1\* 8/2023 Yamamoto .............. F16H 48/40
475/231

\* cited by examiner

DRIVETRAIN COMPONENT

CROSS-REFERENCE TO RELATED APPLICATIONS

This application is a divisional of U.S. patent application Ser. No. 17/994,310 filed on Nov. 26, 2022, which is a continuation-in-part of U.S. patent application Ser. No. 17/886,302 filed on Aug. 11, 2022, which claims the benefit of U.S. Provisional Application No. 63/233,826, filed Aug. 17, 2021. The disclosures of the above applications are incorporated herein by reference.

BACKGROUND OF THE INVENTION

1. Field of the Invention

The present invention generally relates to drivetrain components such as differentials and, more specifically, to drivetrain components having multiple operating modes.

2. Description of Related Art

U.S. Pat. No. 8,808,127 discloses a differential assembly and, more particularly, a differential assembly for a motor vehicle driving axle driveable by an electric motor. The differential assembly comprises a driving gear and a differential drive with an input part and two output parts. The output parts are drivingly connected to the input part and, relative to one another, have a differential effect. A coupling is arranged between the driving gear, the differential gear, and the differential drive. In a closed coupling condition, torque is transmitted from the driving gear to the differential drive and, in an open condition of the coupling transmission, torque is interrupted. A controllable actuator actuates the coupling, and a sensor determines at least three switched positions of the coupling. A driving assembly with such a differential assembly is also disclosed.

U.S. Published Application No. 2020/0079214 discloses a system for a vehicle differential having multiple gears, including a coil of wire, a drive member moveable in response to a magnetic field generated by the application of electricity to the coil between a first position and a second position, and a lock member coupled to the drive member for movement with the drive member throughout a range of movement of the drive member. The lock member is adapted to engage a gear of the differential when the drive member is in the second position, and the lock member is adapted to be disengaged from the gear when the drive member is in the first position. In this way, the differential may be selectively locked.

U.S. Pat. No. 11,047,464 discloses a differential with an overrunning clutch (ORC) assembly. The differential includes a first plain bearing end cap with an interior surface that forms a plain bearing interface with an outer surface of a first side hub. The first plain bearing end cap has a first outer surface portion that engages a first end portion of a roller cage assembly. A second plain bearing end cap with an interior surface that forms a plain bearing interface with an outer surface of the second side hub is also included. The second plain bearing end cap has a first outer surface portion that engages a second end portion of the roller cage assembly. The ORC assembly selectively engages the roller cage assembly during an ORC condition to selectively couple torque between a ring gear and the first and second side hubs.

U.S. Published Application No. 2019/0056019 discloses a differential assembly that includes a two-piece differential carrier, a differential gearset installed within a gearset chamber formed in the differential carrier, and a ring gear. An interlocking feature mechanically interconnects the ring gear to the first and second case members of the two-piece differential carrier and defines first and second weldment junctions. A first weld seam is located in the first weldment junction and connects the ring gear to the first case member, while a second weld seam is located in the second weldment junction and connects the ring gear to the second case member.

U.S. Published Application No. 2018/0326844 discloses a rear-drive module for an all-wheel drive motor vehicle that includes a differential assembly having an outer differential housing and an inner differential housing. The inner differential housing is fixed for rotation with an output shaft of the differential assembly. A ring gear assembly with a ring gear is mounted and fixed for rotation with the outer differential housing. A disconnect and synch-lock mechanism operates to synchronize and lock the inner differential housing and the outer differential housing and to disconnect the inner differential housing and the outer differential housing to prevent rotation of the outer differential housing and the ring gear. The disconnect and synch-lock mechanism may include a synchronizer clutch and a clutch actuator. The clutch actuator may be a ball-ramp or face cam mechanism configured to control the operation of the synchronizer clutch and locking between the inner and outer differential housings.

U.S. Pat. No. 10,591,000, assigned to the assignee of the present application, discloses a coupling member for an engageable coupling assembly, including a coupling face having at least one pocket. Each pocket is sized and shaped to receive and nominally retain a locking member that lays down in its pocket during an overrunning condition of the assembly at a laydown angular velocity of the coupling member about a rotational axis of the assembly. Each pocket has a pocket axis which is angled with respect to a normal to a centerline of the coupling member to improve locking member dynamics regarding strut laydown speed during the overrunning condition.

U.S. Pat. No. 10,711,853, also assigned to the assignee of the present application, discloses an overrunning coupling and control assembly, coupling assembly, and locking member having at least one side surface with a draft to improve locking member dynamics. Locking member dynamics are improved with regards to locking member lay down speed. Lay down speed variation caused by a variable frictional coefficient between a pocket surface of a pocket in which the locking member is received and nominally retained and the at least one side surface of the locking member is minimized.

U.S. Published Application No. 2020/0124115, also assigned to the assignee of the present application, discloses a high-speed overrunning coupling and control assembly, coupling assembly, and locking member that pivotally moves with substantially reduced friction. At least one pivot projects from a main body portion of the locking member and enables pivotal motion of the locking member. The at least one pivot is sized, shaped, and located with respect to the main body portion so that the at least one pivot makes contact with at least one bearing located between a pocket surface of a pocket and an outer surface of the at least one pivot to reduce friction during pivotal motion.

A typical one-way clutch (OWC) consists of an inner ring, an outer ring, and a locking device between the two rings.

The OWC is designed to lock in one direction and to allow free rotation (overrun) in the other direction. Two types of OWCs typically used in vehicular, automatic transmissions to prevent an interruption of drive torque (power flow) during specific gear shifts and to allow engine braking during coasting include roller type, which consists of spring-loaded rollers between the inner and outer race of the OWC, roller type can also be used without springs, and sprag type which consists of asymmetrically shaped wedges located between the inner and outer race of the OWC.

Controllable or selectable one-way clutches (SOWC) depart from traditional OWC designs. SOWCs may add a second set of locking members in combination with a selector plate. Combining an additional set of locking members and the selector plate adds multiple functions to the SOWC. Depending on the needs of the design, controllable SOWCs are capable of producing a mechanical connection between rotating or stationary members in one or both directions or are capable of overrunning in one or both directions. The selector plate of the SOWC is controlled externally. The movement of the selector plate can be between two or more positions that correspond to different operating modes.

A Dynamic Controllable Clutch (DCC) is electrically actuated. A DCC typically has two races; one is a pocket plate, and the other is a notch plate. The pocket plate may contain two locking elements-one for clockwise and the other for counter-clockwise engagement. During engagement, at least one set of locking elements is deployed such that each locking element in the set simultaneously contacts the pocket and notch engagement faces of the pocket and notch plates, respectively, which couples the two plates together to either transmit torque or ground torque, in the case of a brake. The locking elements may be of radial or planar design.

For purposes of this application, the term "coupling" should be interpreted to include clutches or brakes wherein one of the plates is drivably connected to a torque delivery element of a transmission, engine, or motor, and the other plate is connected to another torque delivery element or grounded in the case of a brake. The terms "coupling," "clutch," and "brake" may be used interchangeably.

There is still a need for an overrunning drivetrain component such as a differential disconnect while providing power in reverse and controlling regeneration.

SUMMARY OF THE INVENTION

A drivetrain component including a coupling member rotating about a central axis, the coupling member including a coupling member coupling face, and a rotatable member rotating about the central axis, the rotatable member including a rotatable member coupling face having locking abutments. The coupling member coupling face and the rotatable member coupling face being in close-spaced opposition. A first locking structure selectively mechanically coupling the coupling member to the rotatable member, a second locking structure selectively mechanically coupling the coupling member to the rotatable member, and both the first locking structure and the second locking structure on the coupling member coupling face wherein the first locking structure engages one of the locking abutments in the rotatable member coupling face and the second locking structure engages one of the locking abutments in the rotatable member coupling face.

Further areas of applicability of the present invention will become apparent from the detailed description provided hereinafter. It should be understood that the detailed description and specific examples while indicating an embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or its uses.

Detailed embodiments of the present invention are disclosed herein; however, it is understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting but merely as a representative basis for teaching one skilled in the art to variously employ the present invention. In the different figures, identical parts are provided with the same reference signs, because of which they are generally only described once.

Referring to FIGS. 1-8B, a drivetrain component is illustrated, generally indicated at 10. The drivetrain component may be an electronically controlled, overrunning drivetrain disconnect, having a plurality of operating modes. Such operating modes may include forward, reverse, regenerative, disconnect, and overrunning operating modes.

Figure 1:
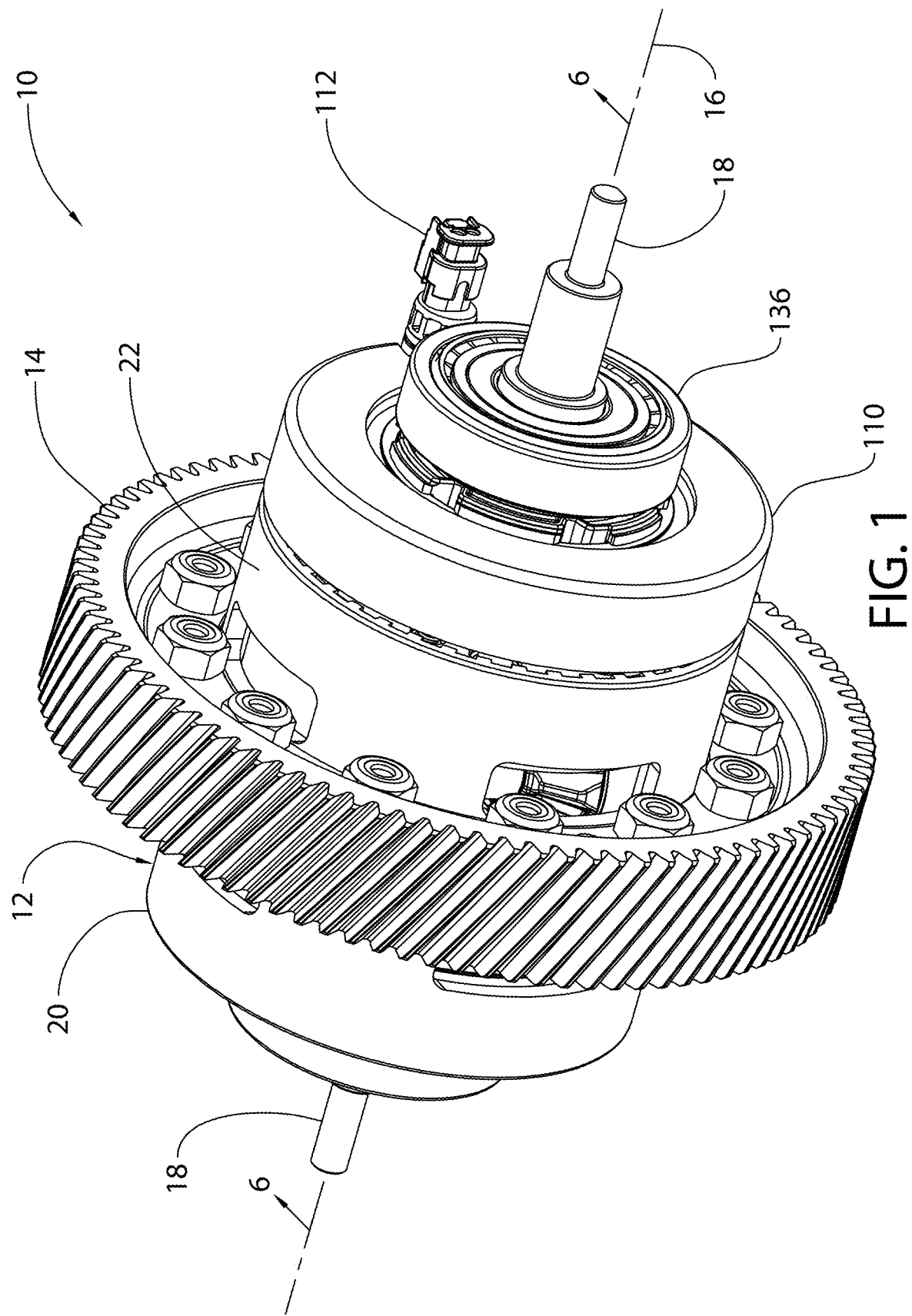
FIG. 1 is a perspective, partial view of a drivetrain component in accordance with at least one example of the present invention.

The drivetrain component 10 includes axles or shafts 18, normally configured to connect to vehicle wheels. FIG. 1 shows the drivetrain component 10, including a case 12 and a ring gear 14 connected to the case 12. The case 12 and ring gear 14 are supported for rotation about a rotational axis 16.

FIGS. 2A-2B and 3A-3B illustrate exploded views of the drivetrain component 10. The case 12 includes first and second case members 20, 22. The first and second case members 20, 22 are supported for rotation about the rotational axis 16 by bearings 130, 136. The bearings 130, 136 are supported in a housing (not shown). The first case member 20 is supported for rotation relative to the housing by the bearing 130 about the rotational axis 16. The second case member 22 is supported for rotation relative to the housing by the hub 128 and the bearing 136 about the rotational axis 16. Each of the first and second case members 20, 22 have extending flanges 24, 26. A plurality of fasteners 28 join the first and second case members 20, 22 at the flanges 24, 26. The fasteners 28 connect the ring gear 14 to the case 12 at the flanges 24, 26. The first and second case members 20, 22 form a case or enclosure around a carrier, generally indicated at 30.

The drivetrain component 10 includes a rotatable member, for example, the carrier 30, which may be comprised of one or more pieces. The carrier 30 has a generally cylindrical shape, including an axially, in the direction of the rotational axis 16, extending annular outer peripheral surface 32 and first and second radially extending side surfaces 34, 36. First and second collars 38, 40 extend axially from the first and second radially extending side surfaces 34, 36. The carrier 30 is supported for rotation about the rotational axis 16. The carrier 30 includes a differential gear set having a pinion shaft 42, pinion gears 44, differential gears 46, and differential gear shafts 48 connected to or part of the axles or shafts 18. The pinion shaft 42 extends through apertures 49 in the carrier 30 and is fitted to the carrier 30. The pinion gears 44 are rotatably mounted on the pinion shaft 42, the pinion shaft 42 and pinion gears 44 rotate with the carrier 30. The differential gears 46 engage the pinion gears 44, rotation of the carrier 30 correspondingly rotates the pinion shaft 42 and pinion gears 44 causing rotation of the differential gears 46 and correspondingly the differential gear shafts 48.

The carrier 30 is rotatably supported in the case 12 for movement relative to and independent of the case 12. The carrier 30 freely rotates in the case 12 about the rotational axis 16 in both a first, clockwise direction and a second, counter-clockwise direction. For example, the first and second collars 38, 40 are used to rotatably mount the carrier 30 in the case 12.

The ring gear 14 connects to a drive shaft, which is not shown. Rotation of the drive shaft correspondingly rotates the ring gear 14, which then rotates the case 12. Because the carrier 30 rotates freely in the case 12, the case 12 may rotate without the carrier 30 rotating, and no torque is transferred from the case 12 to the carrier 30. The drivetrain component 10 includes a first locking structure, generally indicated at 50, and in another example, a second locking structure, generally indicated at 52, for selectively coupling the case 12 and carrier 30.

Figure 2A:
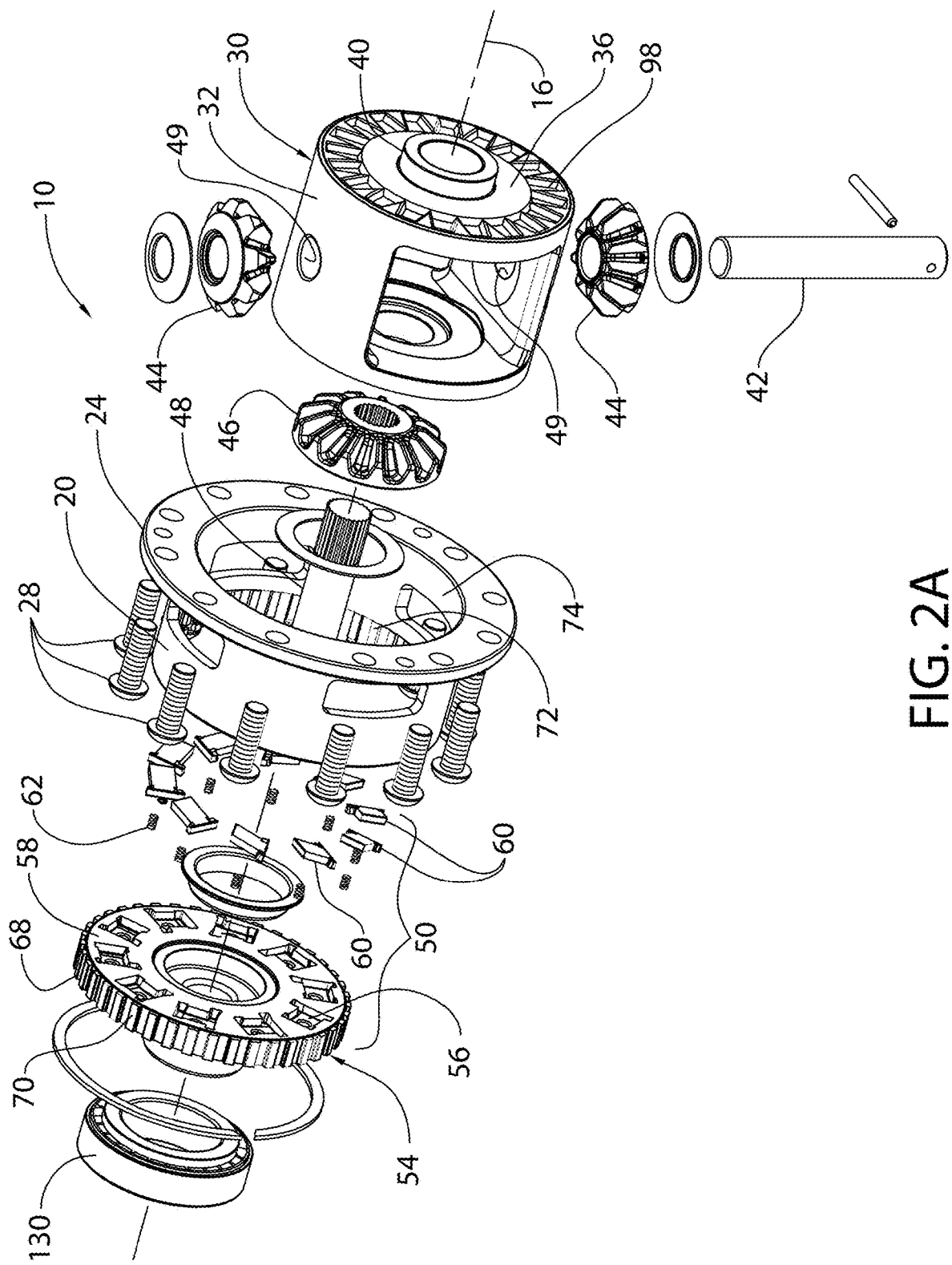
FIG. 2A is an exploded, partial perspective view taken from the right-hand side of the drivetrain component of FIG. 1.

The first locking structure 50 includes a plate-like member 54, having a plurality of pockets 56 in a face or surface 58. The plate-like member 54 may be referred to as a pocket plate. The plate-like member 54 or pocket plate is connected to and rotates with the case 12. FIG. 2A shows an outer peripheral radial surface 68 of the plate-like member 54 having a plurality of splines 70, which engage complementary splines 72 on an inner peripheral surface 74 of the first case member 20 of the case 12. The face or surface 58 of the plate-like member 54 may also be referred to as a first coupling face 20a. A plurality of the locking elements or struts 60 are positioned in the pockets 56. A resilient member or spring 62 positioned in the pocket between the plate-like member 54 and the strut 60 applies a force on the strut 60 urging it outward past the face or surface 58. The first locking structure 50 also includes a plurality of notches 66 in the first side surface 34 of the carrier 30. The first side surface 34 of the carrier 30 may also be referred to as a first coupling face of the carrier 30.

Locking structure refers to a structure assembly capable of producing a mechanical connection. As illustrated, the first locking structure 50 includes a passive locking element, for example, the strut 60, located in the pocket 56 of the plate-like member 54 connected to the first case member 20 of the case 12. The strut 60 is continuously urged out of the pocket 56 by the resilient member or spring 62. The first locking structure 50 is passive in that the strut 60 constantly extends outward of the side face or surface 58; the resilient member or spring 62 constantly urges the strut 60 out of the pocket 56 in the side face or surface 58 of the plate-like member 54. The resilient member or spring 62 constantly urges the strut 60 to a deployed position, wherein the strut 60 extends from the plate-like member 54, out of the pocket 56, and past or above the side face or surface 58.

Because the strut 60 is in a deployed position and the side face or surface 58 of the plate-like member 54 and the first side surface 34 of the carrier 30 are in close-spaced opposition, close-spaced opposition is currently defined as a minimum of 0 to a maximum of 2.5 millimeters, the strut 60 engages the notch 66 in the first side surface 34 of the carrier 30 mechanically connecting the case 12 to the carrier 30 in one direction of rotation. The case 12 transmits torque to the carrier 30 in one direction only; while allowing relative rotation between the case 12 and carrier 30 in the opposite direction.

The resilient members or springs 62 apply a force on the struts 60 to urge them into engagement with the notches 66 on the first side surface 34 of the carrier 30. Using the resilient members or springs 62 to apply an engagement force allows for ratcheting or overrunning.

In one example, the first locking structure 50 may be a one-way or overrunning clutch, for example, a passive one-way clutch wherein the strut 60 constantly extends from the pocket 56. The strut 60, and correspondingly the first locking structure or first one-way clutch 50, is always deployed, creating a drive connection between rotating components, for example, the case 12 and carrier 30, when their relative rotation is in one direction and overrunning when relative rotation is in the opposite direction and producing a drive connection when their relative rotation is in one direction and overrunning when their relative rotation is in the same direction, the driven member rotates faster than the drive member. The one-way clutch imposes torque in one direction and overruns in the opposite direction. The overrun state effectively or passively disconnects the case 12 and the carrier 30 and correspondingly disconnects the drive or power source from the wheels.

Figure 2B:
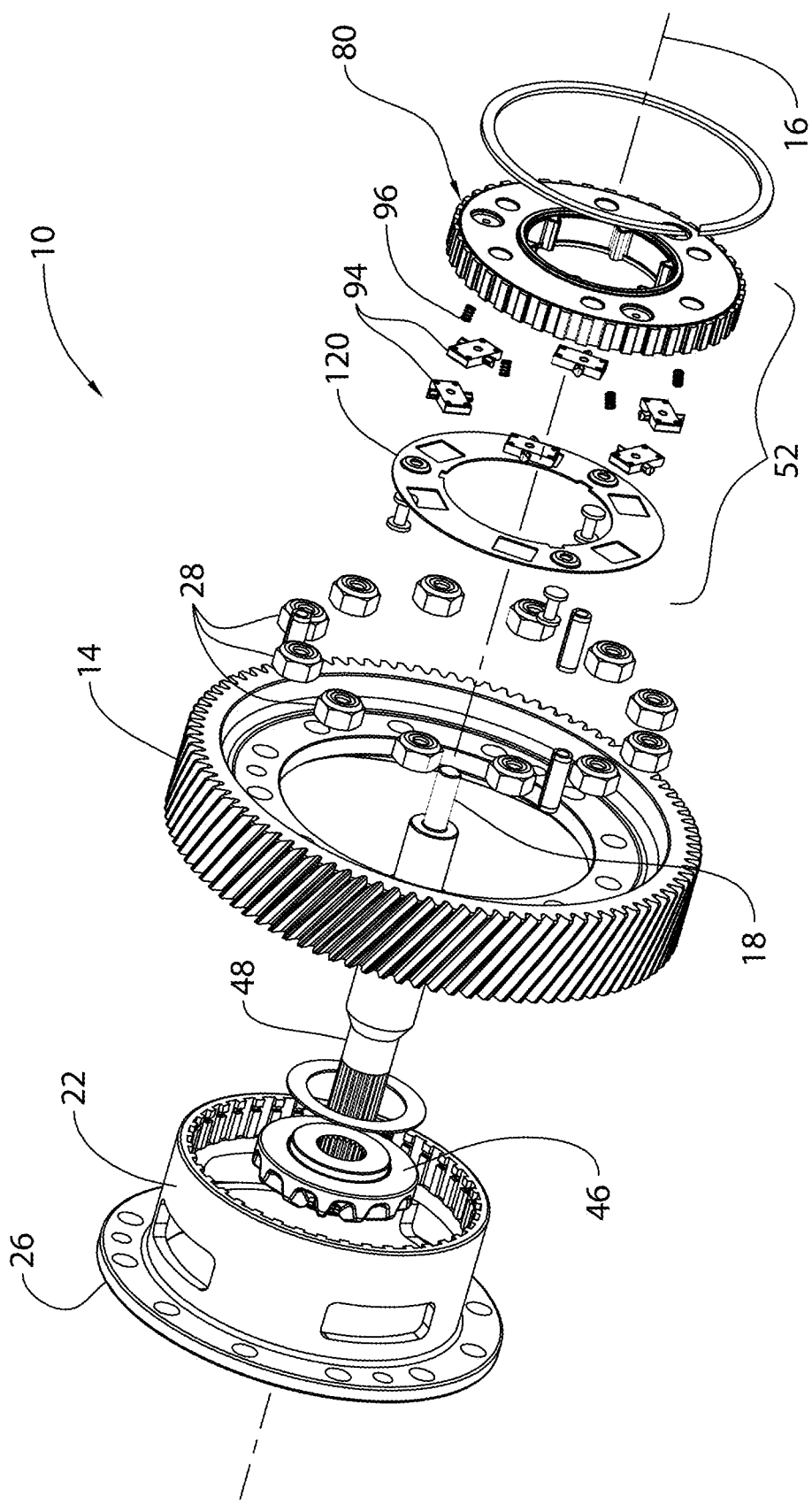
FIG. 2B is an exploded, partial perspective view taken from the right-hand side of the drivetrain component of FIG. 1.
Figure 3A:
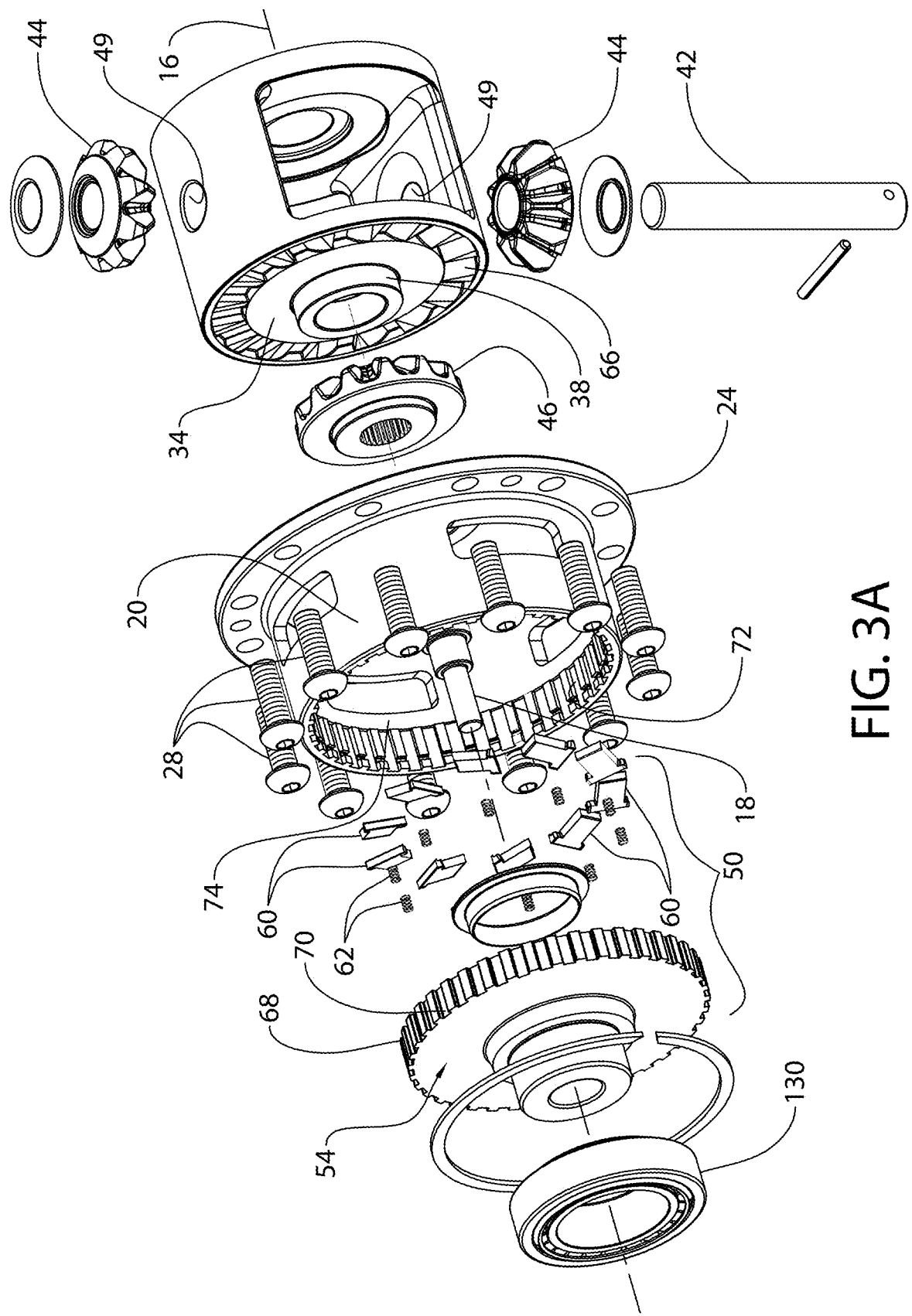
FIG. 3A is an exploded, partial perspective view taken from the left-hand side of the drivetrain component of FIG. 1.
Figure 3B:
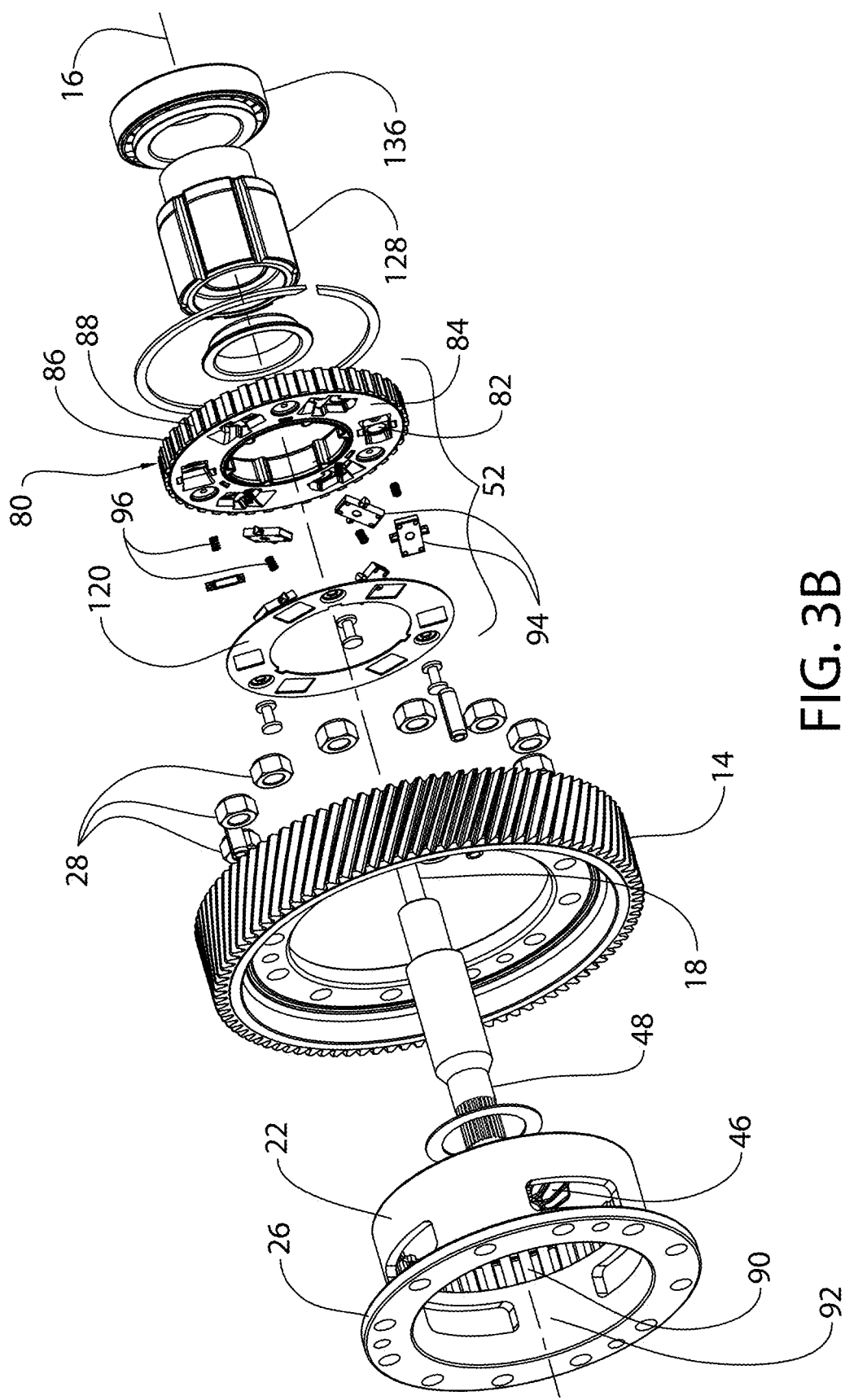
FIG. 3B is an exploded, partial perspective view taken from the left-hand side of the drivetrain component of FIG. 1.

In some aspects, the second locking structure 52 is similar to the first locking structure 50. For example, the second locking structure 52 has a plate-like member 80, having a plurality of pockets 82 in a face or surface 84. The plate-like member 80 may also be referred to as a pocket plate. The plate-like member 80 or pocket plate is connected to and rotates with the case 12. FIG. 2B shows an outer peripheral radial surface 86 of the plate-like member 80 having a plurality of splines 88 which engage complementary splines 90 on an inner peripheral surface 92 of the second case member 22 of the case 12. The face or surface 84 of the plate-like member 80 may be referred to as a second coupling face 22a. A plurality of locking elements or struts 94 are positioned in the pockets 82.

A resilient member or return spring 96 positioned in the pocket 82 between the plate-like member 80 and the strut 94 applies a force on the strut 94 urging it inward into the pocket 82, wherein the strut is at or below the face or surface 84. The second locking structure 52 also includes a plurality of notches 98 in the second side surface 36 of the carrier 30. The second side surface 36 of the carrier 30 may also be referred to as a second coupling face of carrier 30.

As illustrated, the second locking structure 52 includes an active assembly, for example, the strut 94, located in the pocket 82 of the plate-like member 80, connected to the second case member 22 of the case 12. In an active assembly, an actuator assembly, generally indicated at 100, moves the strut 94, located in the pocket 82 of the plate-like member 80, between a non-deployed position—the strut 94 located in the pocket 82 and a deployed position—the strut 94 extending outwardly from the pocket 82 and beyond or past the face or surface 84 of the plate-like member 80. The strut 94 moves between a deployed position and a non-deployed position.

Because the side face or surface 84 of the plate-like member 80 and the second side surface 36 of the carrier 30 are in close-spaced opposition, when the strut 94 is moved to the deployed position, the strut 94 engages a notch 98 in the second side surface 36 of the carrier 30, mechanically connecting the case 12 to the carrier 30 in one direction of rotation.

The drivetrain component 10 may also include an actuator or actuation mechanism, generally indicated at 100. Examples of an actuator or actuation mechanism 100 include, but are not limited to, a linear actuator, a lead screw actuator, a shift fork, or any other system or assembly moving the locking member. The actuator or actuation mechanism 100 interacts with and moves a locking member, for example, the strut 94. In one example, the actuator or actuation mechanism 100 acts on a spring plate 102. The spring plate 102 connects to a spring 104. The spring 104 extends through an opening or passage 114 in the plate-like member 80 and engages the strut 94. Axial movement of the spring plate 102 compresses the spring 104. The spring 104 acts on the strut 94 and overcomes the force of the resilient member or return spring 96, causing the strut 94 to extend out of the pocket 82 and past the face or surface 84 of the annular or plate-like member 80 connected to the second case member 22 of the case 12.

Both resilient members or springs 62, 104 apply a force on the struts 60, 94 urging them into engagement with the notches 66, 98 first and second side surfaces 34, 36 of the carrier 30. Using the resilient members or springs 62, 104 to apply an engagement force allows for ratcheting or overrunning.

In one example, the second locking structure 52 may be an active one-way clutch or overrunning clutch, for example, a dynamically controllable clutch (DCC) selectively producing a drive connection between rotating components, for example, the case 12 and the carrier 30, when their relative rotation is in one direction and overrunning when relative rotation is in the opposite direction and producing a drive connection when their relative rotation is in one direction and overrunning when their relative rotation is in the same direction, the driven member rotates faster than the drive member. The active one-way clutch imposes torque in one direction and overruns in the opposite direction.

In another example, the drivetrain components 10 include the case 12 and the carrier 30. The case 12 includes a first case member 20 and a second case member 22. The first case member 20 has a coupling face 20a and the second case member 22 has a coupling face 22a. The first coupling face 20a in a close spaced opposition with a first coupling face, for example, the first side surface 34, of the carrier 30 and the second coupling face 22a of the case 12 in close spaced opposition with a second coupling face, for example, the second side surface 36, of the carrier 30. The coupling faces 20a, 22a of the case 12 may include pockets, and the coupling faces of the carrier 30 may include locking formations or notches.

The strut 60 mechanically couples the case 12 and the carrier 30 at the first coupling face 20a of the case 12 and the first coupling face, first side surface 34 of the carrier 30, and the strut 94 selectively mechanically couples the case 12 and the carrier 30 the second coupling face 22a of the case 12 and the second coupling face, second side surface 36 of the carrier 30. The struts 60, 94 are disposed between the respective faces.

The actuator or actuation mechanism 100 of the drivetrain component 10 may include an electrically switchable linear actuator device or control subassembly, generally indicated at 106. The linear actuator 106 actively controls an operating mode of the drivetrain component 10 by generating an electromagnetic force interacting with a translator structure 108, causing the struts 94 to move between the first coupling face of the case 12 and the first coupling face of the carrier 30. The struts 60 passively control an operating mode of the drivetrain component 10. In one passive operating mode, the case 12 overruns the carrier 30.

As illustrated, the drivetrain component 10 typically includes conventional parts such as shafts 18 configured to fit vehicle wheels, differential gears 46 mounted within the carrier 30 for rotation on one end of the differential gear shafts 48, and pinion gears 44 mounted at opposite ends of the pinion shaft 42 in mating engagement with the differential gears 46 for differential rotation within the carrier 30. The carrier 30 is encased within the subassembly of the joined first and second case members 20, 22 to rotate therewith about the rotational axis 16.

Due to the needs of various vehicles, the drivetrain component 10 can serve as an overrunning secondary axle differential. This increases efficiency by not allowing the E-motor to drag on the system when the motor is off.

The drivetrain component 10 is a fully contained, open, locked, limited slip, or the like differential controlled by first and second sets of clutching elements or locking members, for example, the struts 60, 94. The first locking structure 50, and correspondingly the struts 60, provides a locking action between the case 12 and the carrier 30 preventing the case 12 from exceeding the rotational velocity of the carrier 30. The second locking structure 52, including the struts 94, is controllable and provides a locking action between the case 12 and the carrier 30, with the input provided by the ring gear 14.

The system or disconnect design of at least one example of the drivetrain component 10 may operate as a differential with the added ability to overrun. For example, the system functions as differential during a turn by allowing the wheels to spin at different speeds. The new feature disclosed herein allows the system to overrun when both wheels exceed the ring gear speed in the forward direction during the off condition. The passive engagement of the system allows power to be sent through the system in the forward direction without the need for controls. The passive engagement reduces torque delay.

The actuation mechanism 100 operates to lock the clutching elements or locking members, for example, the struts 94. This allows the vehicle to provide torque in the opposite direction, for example, the reverse direction.

Typically, systems needed to be in a controlled "on" to carry torque when going back and forth between regeneration/reverse and forward or, in some cases, coast and power forward. The disconnect ability of the drivetrain component 10 allows the user to bounce back and forth with little torque delay and with potentially lower noise, vibration, and harshness. The design can be used in an internal combustion engine, hybrid, or electric vehicle for a passive system or a semi-controllable transfer case.

The case 12 includes first and second coupling faces 20a, 20b, each including pockets—the case 12 functions as a first pocket plate and a second pocket plate. The carrier 30 includes first and second coupling faces 34, 36, each including notches, wherein the carrier 30 functions as a first and second notch plate. The respective orientation of both the coupling faces 20a, 20b of the case 12 and the coupling faces 34, 36 of the carrier 30 may vary. While the first and second coupling faces 20a, 20b of the case 12 are generally annular and extend radially to the rotational axis 16, they may extend into other directions, for example, radial, axial, or some combination thereof. The orientation is relevant only in that adjacent coupling faces of the case 12 and the carrier 30 are arranged so that a locking element, such as a strut, mechanically couples the case 12 and carrier 30.

Figure 4:
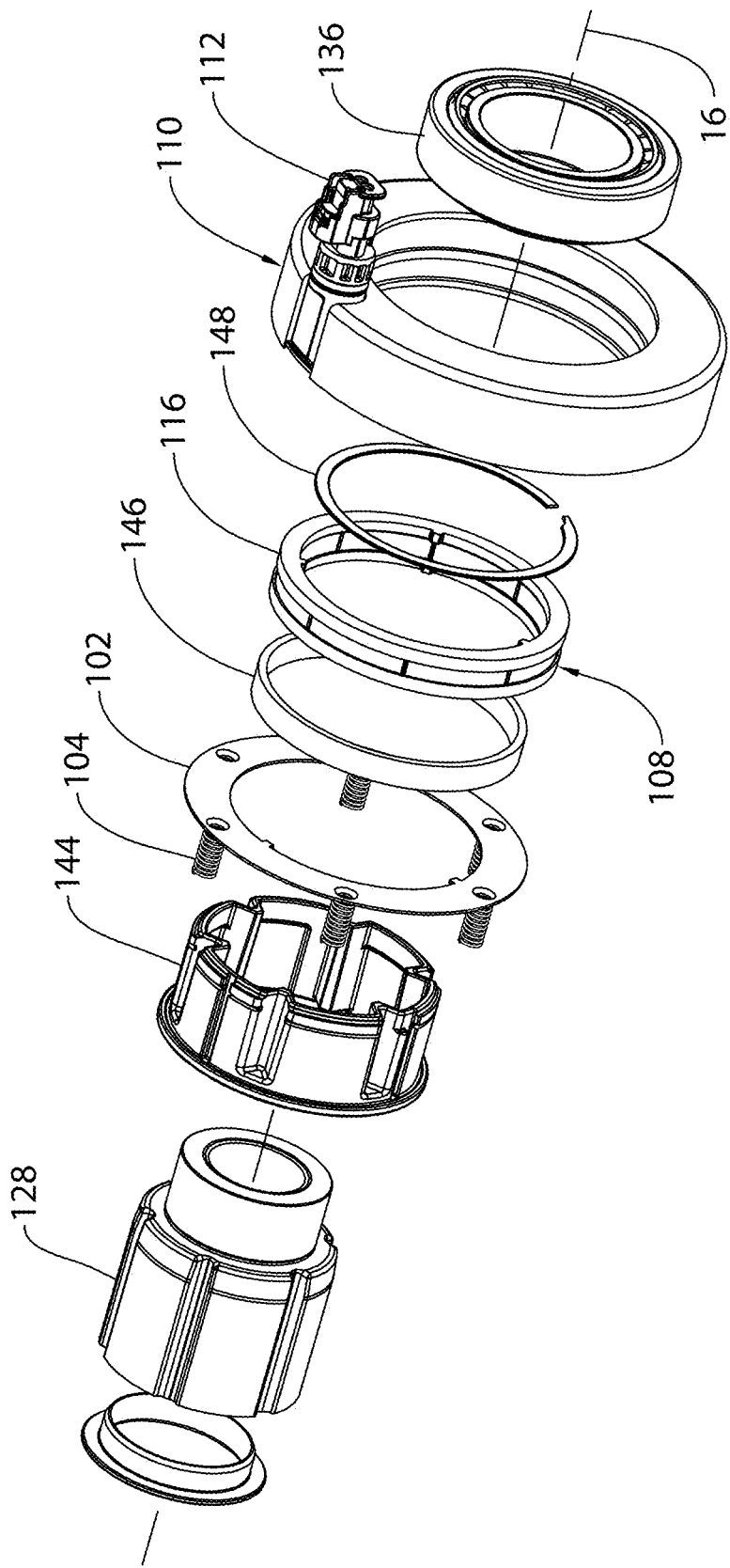
FIG. 4 is an exploded perspective view of an actuator assembly of the drivetrain component of FIG. 1.

Referring specifically to FIG. 4, the linear actuator device or subassembly 106 includes a stator structure 110 and a translator structure 108. The stator structure 110 is connected to the housing (not shown), remains stationary, and does not rotate. The translator structure 108 is connected to the case 12 and rotates about the rotational axis 16. It is supported for translational movement relative to the stator structure 110 along the rotational axis 16 between the first and second axial end positions, which correspond to different operating modes of the drivetrain component 10. A coupler 112 provides electrical power to the stator structure 110.

Figure 5:
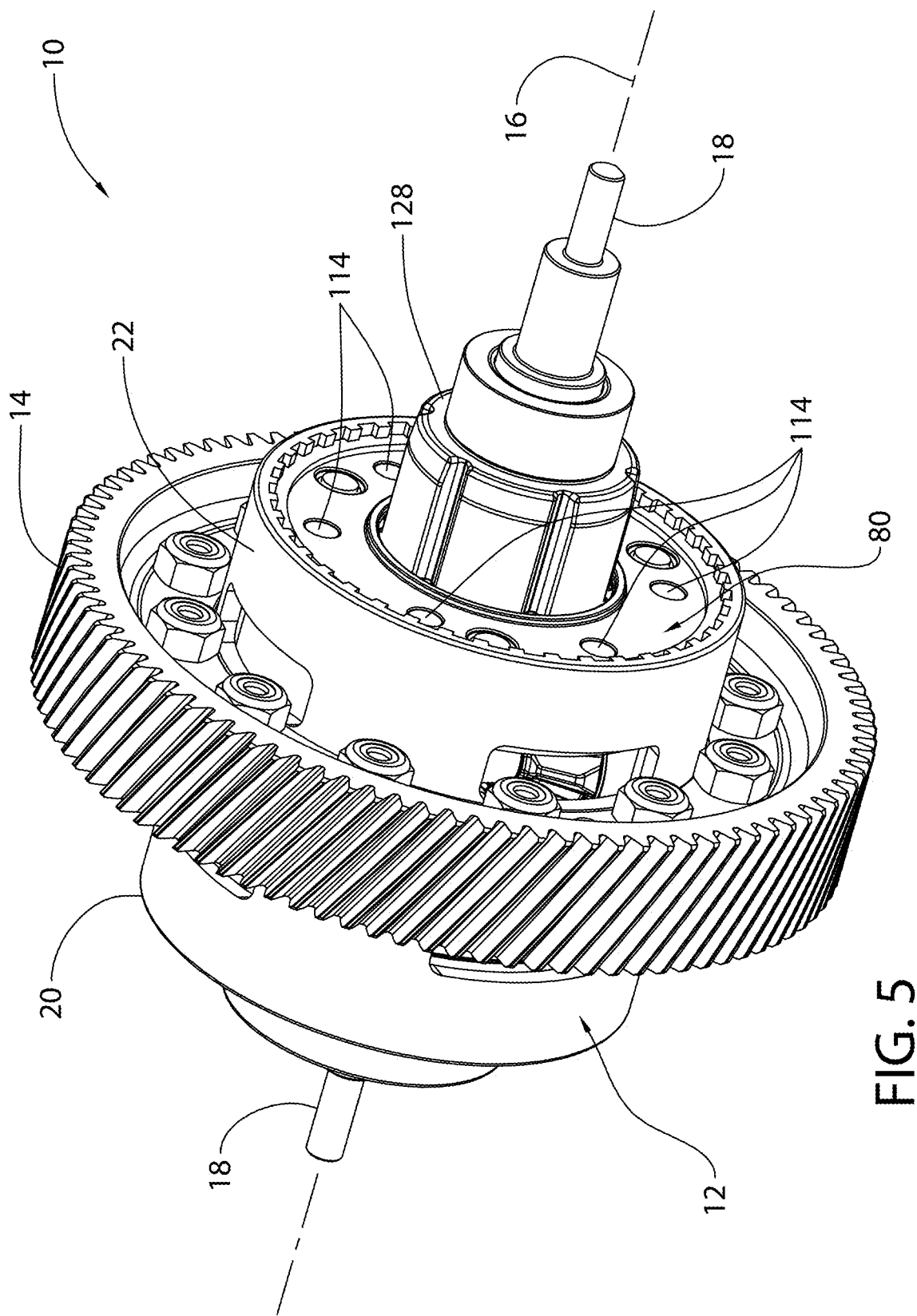
FIG. 5 is a perspective view of the drivetrain component of FIG. 1 with a portion of the actuator assembly removed.

FIG. 5 illustrates the openings or passages 114 in the second case member 22, specifically the plate-like member 80. The passages 114 communicate with respective pockets 82. The locking members or struts 94 located in the pockets 82. The passage 114 provides actuating force access to the strut 94 within the pocket 82.

The translator structure 108 includes a plurality of plungers, shown in the form of springs 104. Each spring 104 is configured to move within one of the passages 114 and engage one of the locking members or struts 94 within its pocket 82 to actuate its locking member or strut 94 for selective strut 94 movement. Other types of elastically deformable plungers or actuators may be used to provide the actuating forces. The walls of the passages 114 are rigid so that the springs 104 are radially supported at the potentially high rotational speeds of the case 12.

Preferably, the first and second locking structures 50, 52 include planar struts. Alternatively, the first and second locking structures 50, 52 may include radial/planar struts, i.e., the first locking members are radial struts, and the second locking members are planar struts; planar/radial struts, i.e., the first locking members are planar struts, and the second locking members are radial struts; or radial/radial struts, i.e., both the first and second locking members are radial struts.

The first locking members or struts 60 transmit torque between the first case member 20 and the carrier 30 in one direction while allowing relative motion between the case 12 and the carrier 30 in the other direction. The case 12 may include a first case member 20 and a second case member 22. The first case member 20 may be referred to as a pocket plate and has the generally flat, annular coupling face 20a opposed to the first coupling face or first side surface 34 of the carrier 30 and is oriented to face axially along the rotational axis 16. The coupling face 20a of the first case member 20 has pockets 56, each sized and shaped to receive and nominally retain the first locking members or struts 60. The pockets 56 are angularly spaced about the rotational axis 16. The first coupling face or first side surface 36 of the carrier 30 has a plurality of locking formations or notches 66 that are engaged by the first locking members or struts 60 projecting or pivoting from pockets 56 formed in the second case member 22 to transmit torque and prevent relative rotation of the second case member 22 and correspondingly the case 12 and the carrier 30 with respect to each other in at least one direction about the rotational axis 16.

The second locking members or struts 94 controllably transmit torque between the case 12 and the carrier 30. The second case member 22 may be referred to as a pocket plate having a generally flat, annular coupling face 22a opposed to the second coupling face or second side surface 36 of the carrier 30 and oriented to face axially along the rotational axis 16. The coupling face 22a of the second case member 22 has pockets 82, each sized and shaped to receive and nominally retain the first locking members or struts 94. The pockets 82 are angularly spaced about the rotational axis 16. The second coupling face or second side surface 36 of the carrier 30 has a plurality of locking formations or notches 98 that are engaged by the first locking members or struts 94 projecting or pivoting from pockets 82 formed in the second case member 22 to transmit torque and prevent relative rotation of the second case member 22 and correspondingly the case 12 and the carrier 30 with respect to each other in at least one direction about the rotational axis 16.

An apertured retainer cover or element cover 120 may be supported between the second case member 22 and the carrier 30. The retainer element 120 has a plurality of spaced openings extending completely therethrough to allow the second locking members or struts 94 to extend therethrough and lock the second case member 22 and correspondingly the case 12 to the carrier 30. The retainer cover or element cover 120 may be prevented from rotating relative to the second case member 22 by shoulders circumferentially spaced about the outer periphery of the retainer cover or element cover 120 fitting within corresponding apertures formed in an inner axial surface of the second case member 22.

Figure 6:
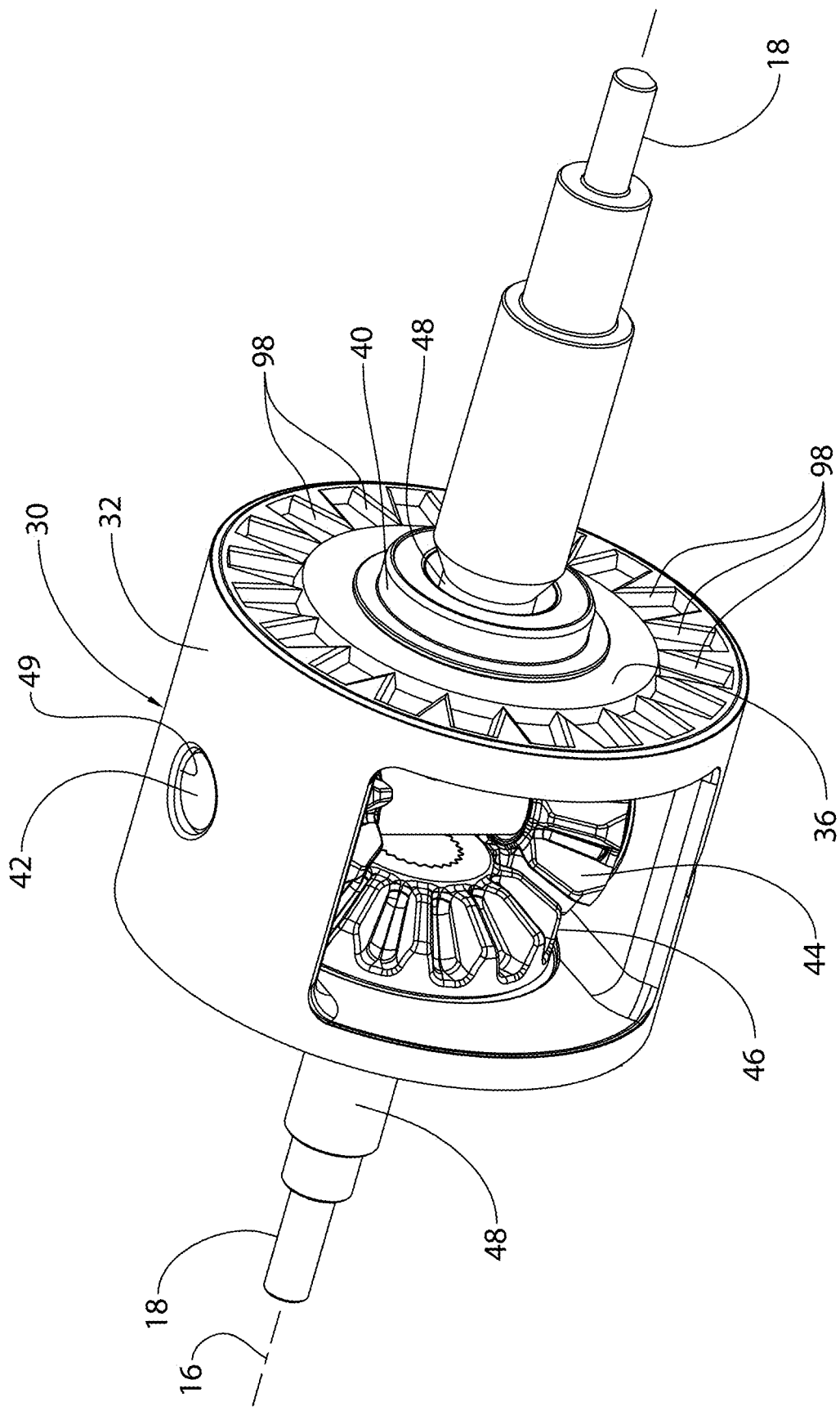
FIG. 6 is a perspective view of the carrier assembly of the drive component with the case removed.
Figure 7:
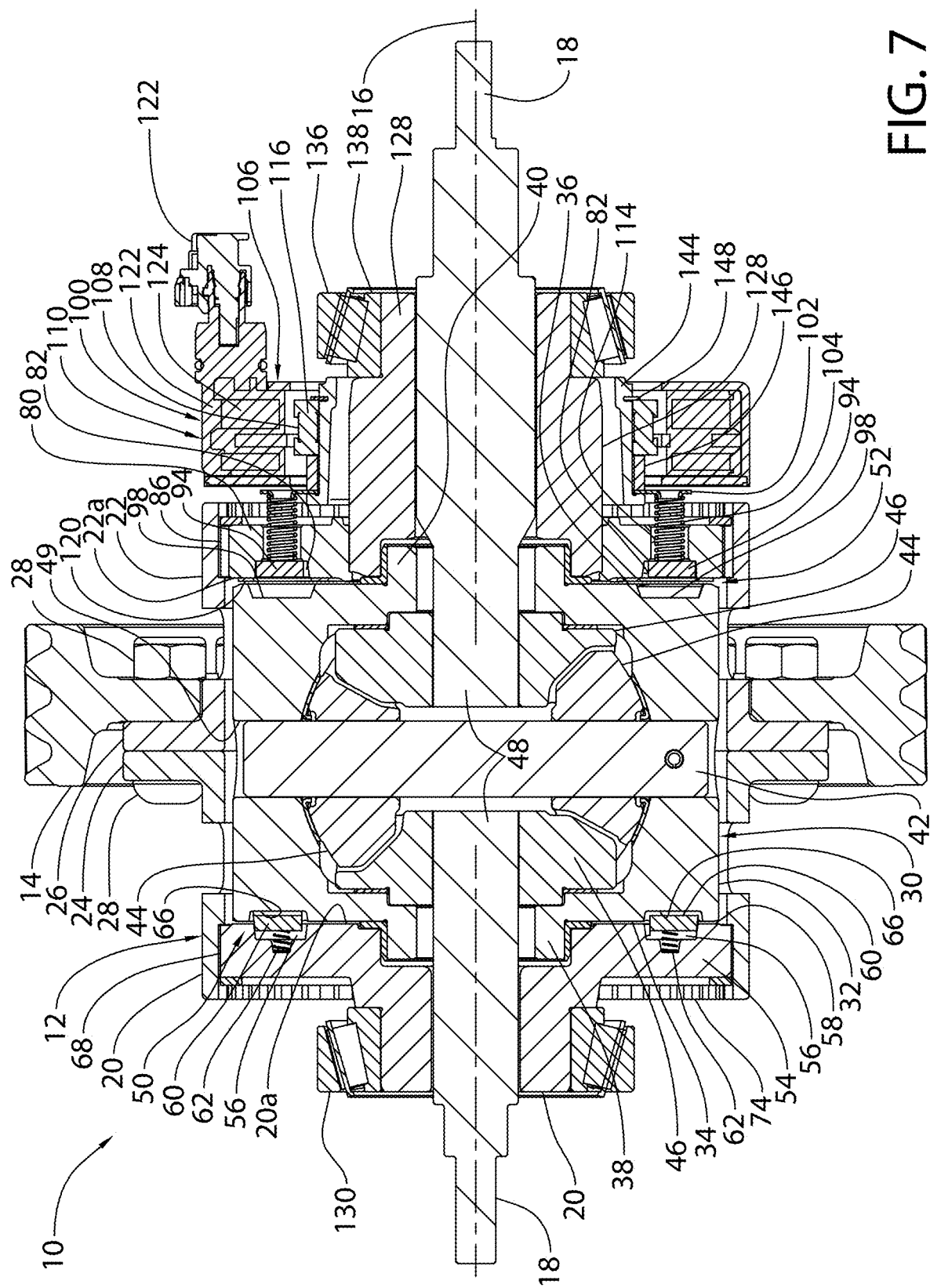
FIG. 7 is a sectional view of the drive component of FIG. 1 taken along lines 7-7 of FIG. 1.
Figure 8B:
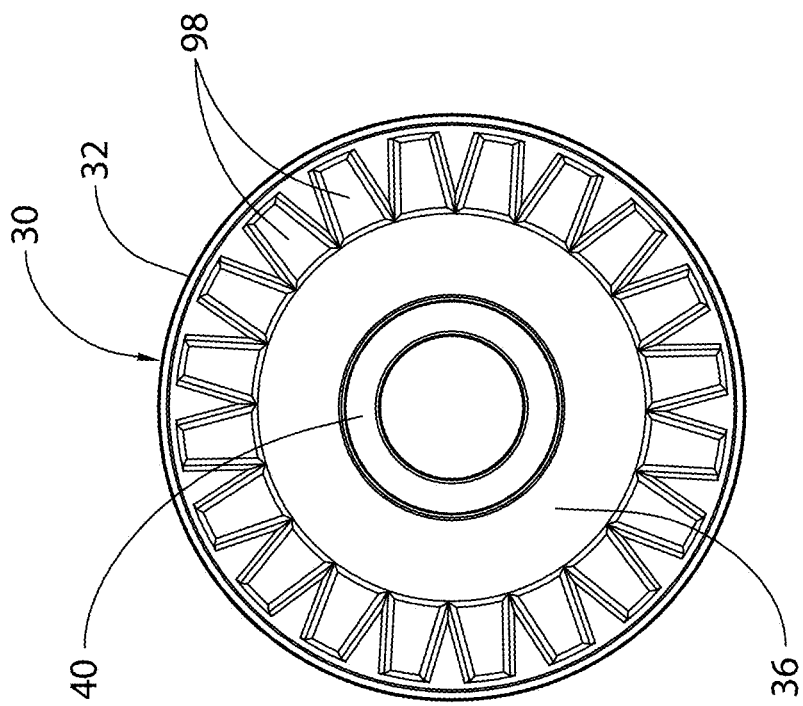
FIG. 8B is a view similar to the view of FIG. 7 illustrating locking formations or notches formed on an opposite face of the carrier.
Figure 8A:
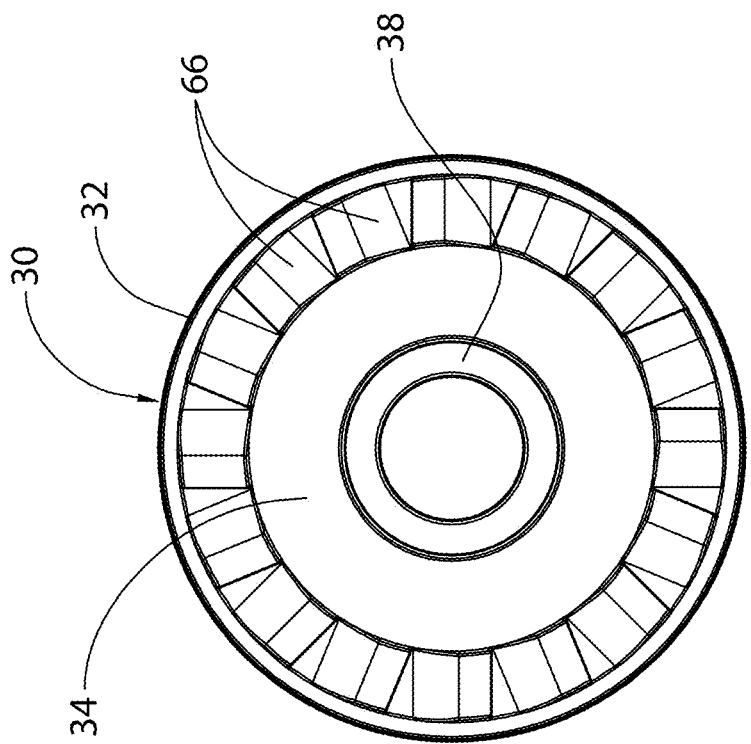
FIG. 8A is an end view of a carrier of the drive component of FIG. 1 illustrating locking formations or notches formed on a face of the carrier.
Figure 9:
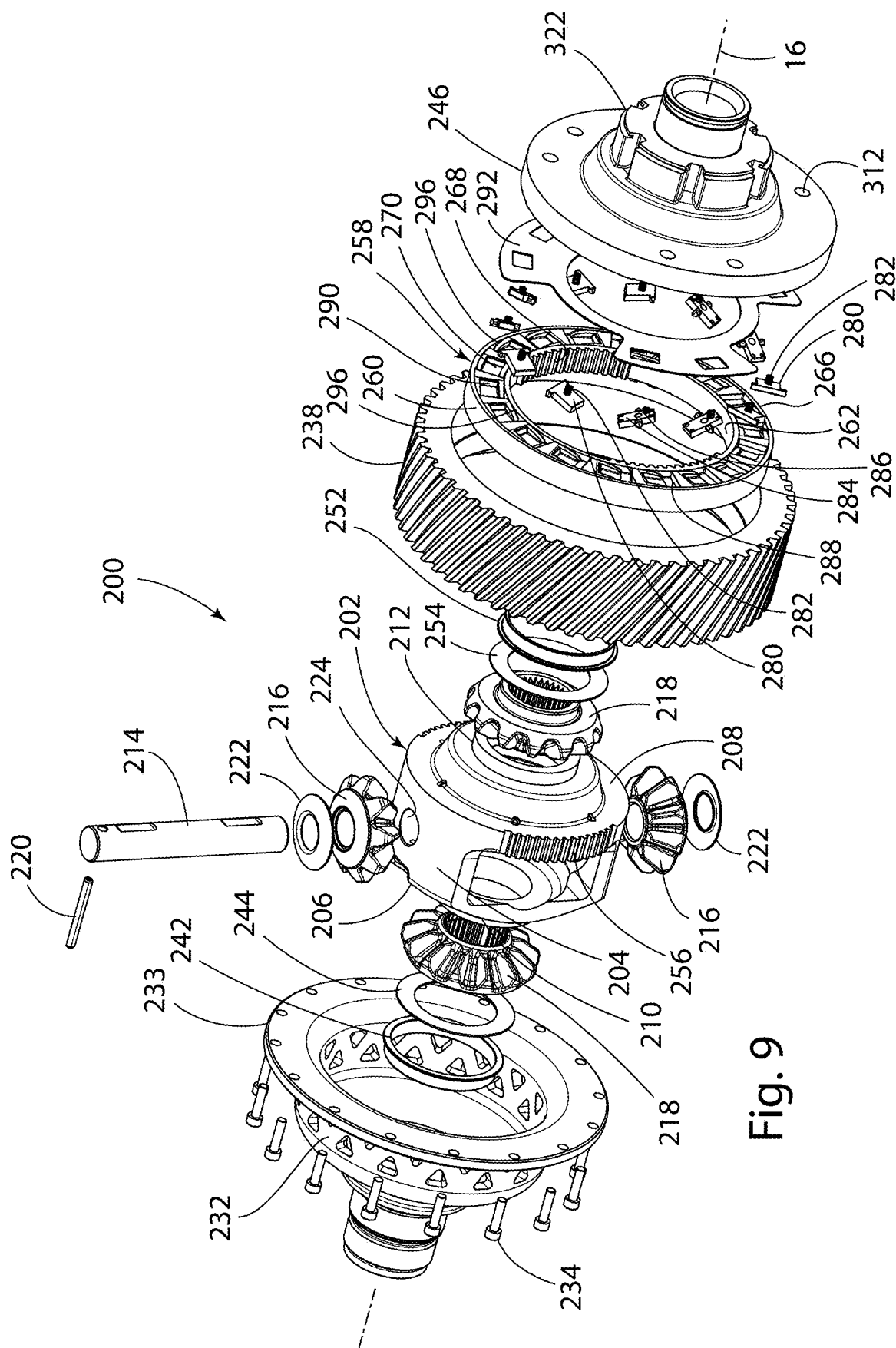
FIG. 9 is an exploded, partial perspective view taken from the right-hand side of the drivetrain component in accordance with another example of the present invention.
Figure 10:
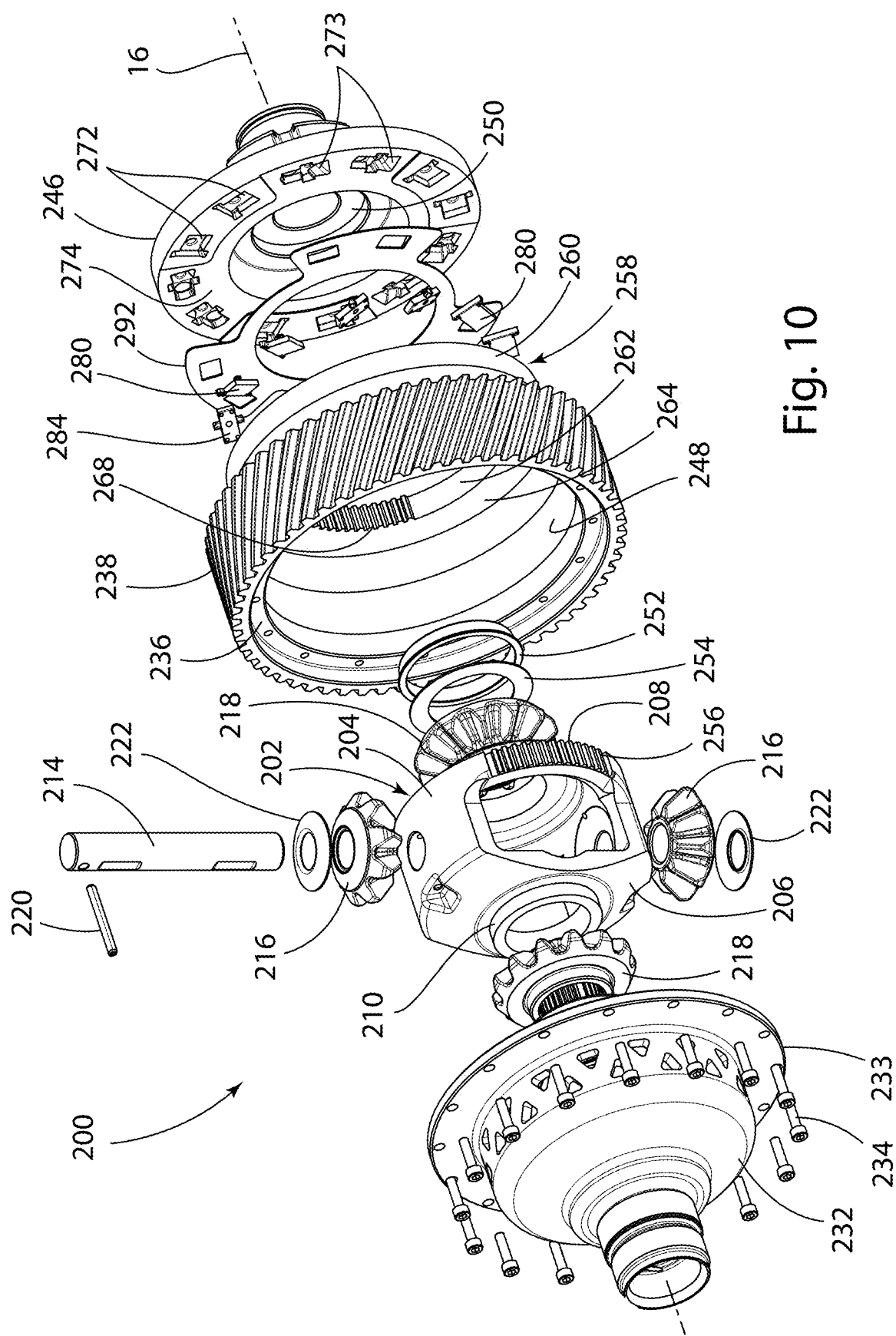
FIG. 10 is an exploded, partial perspective view taken from the left-hand side of the drivetrain component of FIG. 9.

The stator structure 110 includes a ferromagnetic housing 122 having spaced apart fingers with the electromagnetically inductive coils 124 housed between adjacent fingers. As shown in FIG. 6, the stator structure 110 has two electromagnetically inductive coils 124 to create a magnetic flux when one or both electromagnetically inductive coils 124 are energized. The stator structure 110 applies a first magnetic control force to the translator one way when the electromagnetically inductive coils 124 are energized to cause the translator to move along the rotational axis 16. The translator structure 108 reacts to the magnetic control force by moving the spring plate 102 and corresponding springs 104 along the rotational axis 16. By reversing the current direction in the electromagnetically inductive coils 124, the translator structure 108 causes the spring plate 102 and corresponding springs 104 to move in the opposite direction along the rotational axis 16.

The translator structure 108 is configured for coupling with the second case member 22 to rotate therewith. The translator structure 108 is supported for rotation relative to the housing by the hub 128 and bushing or bearing 136 about the rotational axis 16. The translator structure 108 may include a permanent magnet latch mechanism to hold the translator structure 108 in its "on" position and its "off" position without using any electrical energy. The magnetic latch mechanism of the translator structure 108 allows for lower energy usage, which means better vehicle efficiencies, less damage, and wear to the components. Each of the springs 104 has a free end portion adapted to move within its passage 114 and engage a locking member or strut 94 for selective locking member or strut movement.

Referring specifically to FIG. 4, the translator structure 108 is operatively connected to the springs 104 via a spring plate 102 to linearly move the spring 104 in unison. The spring 104 is supported on the spring plate 102 by spring supports formed on the spring plate 102. The translator structure 108 moves upon receiving a net translational magnetic force to move the translator structure 108 linearly and correspondingly, the springs 104 within their passages 114. The selective bi-directional shifting movement of the translator structure 108 along the rotational axis 16 between a first position corresponding to a first mode of the drivetrain component 10 and a second position corresponding to a second mode of the drivetrain component 10. The first and second operating modes may be a locked mode and an unlocked-free-wheeling mode.

Each pocket 82 has an inner recess for receiving a return spring 132. The return spring 132 acts on the locking member or strut 94 to resist pivotal motion of the locking member or strut 94 towards a deployed or engaged position. The spring 104 acts on the locking member or strut 94 to pivot the locking member or strut 94 over the force of the return spring 132.

The linear actuator 106 may include the hub 128 adapted for coupling with the second case member 22. The second case member 22 is supported for rotation relative to the housing by the hub 128 and the bearing 136 about the rotational axis 16. A snap ring 138 holds the bearing 136 against the hub 128. The hub 128 also slidably supports the spring plate 102 and the translator structure 108 during its shifting movement along the rotational axis 16.

The translator structure 108 of the linear actuator 106 includes an annular outer subassembly or translator ring 116 connected to the translator hub 144, a spacer 146, and a snap ring 148. The translator ring 116 includes magnetic annular ring segments sandwiched between a pair of ferromagnetic backing rings acted upon by the stator coil electromagnetic force, which moves the translator structure 108, spring plate 102, and springs 104 between the "off" and "on" positions. The spring plate 102 and springs 104 move axially along the translator hub 144.

The linear actuator 106 may include a set of spaced guide pins sandwiched between the inner surface of the translator hub 144 and an outer surface of the second case member 22 and extending along the rotational axis 16. The inner and outer surfaces may have V-shaped grooves or notches formed therein to hold the guide pins. The translator hub 144 slides on the guide pins during axial movement of the spring plate 102 and the springs 104 along the rotational axis 16.

When the actuation mechanism 100 is commanded to disengage the active locking member or strut 94, the centrifugal force generated by the rotating locking member or strut 94 can cause the locking member or strut 94 to stick in the notch 98 of the second side surface 36 of the carrier 30 and keep a disengagement of the locking member or strut 94 from occurring. To overcome these forces, the resilient member or return spring 96 can be used. In embodiments of the present invention, the locking member or strut 94 is disengaged by the spring force of the resilient member or return spring 96.

At least one example of the present invention includes a drivetrain component providing an electronically controlled, overrunning drivetrain disconnect having a plurality of operating modes that can be both actively and passively controlled. The provided electronically controlled, overrunning drivetrain disconnect has a plurality of operating modes. The operating modes may include a forward operating mode wherein forward torque is controlled passively, a reverse operating mode, a regenerative operating mode, a disconnect operating mode, and a non-synchronous clutch mode, meaning the driving member does not have to synchronize its rotational speed with the clutch before it can re-engage the driven member.

The drivetrain component functions as a disconnect, disconnecting drivetrain input from the drive wheels at the differential. The disconnect occurs at the differential between a differential case and a carrier. The carrier includes the differential gear set. The carrier and differential gear set is aligned for rotation inside the differential case and rotates on the same central axis as the differential case. The carrier rotates in the differential case relative to and independent of the differential case. At least one locking structure is used to couple the differential case to the carrier to transmit torque from the differential case to the carrier.

The drivetrain component may include a linear actuator selectively actuating a second locking structure used to couple the differential case to the carrier to transmit torque from the differential case to the carrier.

The linear actuator may be used to actively control the operating modes of the drivetrain component by activating one of the locking members or struts for selective movement between coupling faces. Wherein the other set of locking members or struts passively controls operating modes between the coupling faces and allows them to overrun with respect to each other in one of the operating modes.

FIGS. 9-13 illustrate an additional example of a drivetrain component 200. Like the forgoing example, the drivetrain component 200 includes a rotatable member, for example, the carrier 202, which may comprise one or more pieces. The carrier 202 has a generally cylindrical shape, including an axially, in the direction of the rotational axis 16, extending annular outer peripheral surface 204 and first and second radially extending side surfaces 206, 208. First and second collars 210, 212 extend axially from the first and second radially extending side surfaces 206, 208. The carrier 202 is supported for rotation about the rotational axis 16. The carrier 202 includes a differential gear set having a pinion shaft 214, pinion gears 216, and differential gears 218. The differential gears 218 connect to differential gear shafts (not shown) connected to or part of the axles or shafts 18. The pinion shaft 214 extends through an aperture 224 in the carrier 202 and is secured to the carrier 202 by a pin 220. The pinion gears 216 are rotatably mounted on the pinion shaft 214 inside the carrier 202. Thrust washers 222 are between the pinion gears 216 and the carrier 202. The pinion shaft 214 and the pinion gears 216 rotate with the carrier 202. Thrust washers 244, 254 are between the differential gears 218 and the carrier 202. The differential gears 218 engage the pinion gears 216, and rotation of the carrier 202 correspondingly rotates the pinion shaft 214 and pinion gears 216 causing rotation of the differential gears 218 and correspondingly the differential gear shafts and axles or shafts 18.

The drivetrain component 200 includes a case 230. The case 230 includes a cup-shaped housing 232 with a radially extending flange 233. Threaded fasteners 234 extend through the radial extending flange 233 and connect the cup-shaped housing 232 to a side surface 236 of a ring gear 238. The cup-shaped housing 232 includes an internal bore or socket 240. A bushing 242 rotatably support the first collar 210 of the carrier 202 in the internal bore or socket 240.

A coupling member, for example, a plate-like member having a plurality of pockets, commonly referred to as a pocket plate 246, is secured to the inner peripheral surface 248 of the ring gear 238 and rotates with the ring gear 238. The pocket plate 246 may be integral with the ring gear 238 or the individual components may be secured together, for example, by fasteners, press fitting, welding, or in other suitable ways. The pocket plate 246 has an internal bore or socket 250. A bushing 252 rotatably support the second collar 212 of the carrier 202 in the internal bore or socket 250. The carrier 202 rotates within the cup-shaped housing 232 independently of the pocket plate 246.

A rotatable member, for example, a notch plate 258, is shown in the present example as an annular member 260 having an inner peripheral surface 262 and opposing first and second side surfaces or faces 264, 266. The inner peripheral surface 262 includes a plurality of splines 268. The outer peripheral surface 204 of the carrier 202 includes a plurality of splines 256. The splines 256 of the carrier 202 mesh with the splines 268 of the notch plate 258 and connect the notch plate 258 to the carrier 202, enabling torque transfer between the notch plate 258 and the carrier 202.

The notch plate 258 may be formed integrally with the carrier 202. In addition to the splined connection, other suitable mechanisms connecting the notch plate 258 to the carrier 202 may be used, provided there is no relative rotation between the notch plate 258 and carrier 202.

The notch plate 258 includes angularly spaced recesses or notches 270 in the second side surface or face 266 of the notch plate 258. The angularly spaced recesses or notches 270 in the present example providing a locking abutment, a part of the notch plate 258 that directly receives force or pressure. In addition to being notches 270, the locking abutments could be projections or some other force or pressure receiving element. The second side surface or face 266 of the notch plate 258 may also be referred to as a coupling face.

The pocket plate 246 includes angularly spaced recesses or pockets 272, 273 in a side surface or face 274 of the pocket plate 246. The side surface or face 274 of the pocket plate 246 may also be referred to as a coupling face. Struts 280, 284 are held in their respective pockets 272, 273 by a retainer plate 292.

The ring gear 238 connects to a drive shaft that rotates the ring gear 238, which then rotates the case 230. Because the carrier 202 rotates freely in the case 230, the case 230 may rotate without the carrier 202 rotating, and no torque is transferred from the case 230 to the carrier 202. The drivetrain component 200 includes a first locking structure, generally indicated at 276, and a second locking structure, generally indicated at 278, for selectively coupling the case 230 and carrier 202.

Locking structure refers to a structure assembly capable of producing a mechanical connection. As illustrated, the first locking structure 276 includes a passive locking element, for example, the strut 280, in the pocket 272 of the pocket plate 246 connected to the ring gear 238. The strut 280 is continuously urged out of the pocket 272 by a resilient member or spring 282. The first locking structure 276 is passive because the strut 280 constantly extends outward of the side surface or face 274 of the pocket plate 246; the resilient member or spring 282 constantly urges the strut 280 out of the pocket 272 in the side surface or face 274 of the pocket plate 246. The resilient member or spring 282 constantly urges the strut 280 to a deployed position, wherein the strut 280 extends from the pocket plate 246, out of the pocket 272, and past or above the side surface or face 274.

Because the strut 280 is in a deployed position and the side surface or face 274 of the pocket plate 246 and the second side surface or face 266 of the notch plate 258 are in close-spaced opposition, close-spaced opposition is currently defined as a minimum of 0 to a maximum of 2.5 millimeters, the strut 280 engages a notch 270 in the second side surface or face 266 of the notch plate 258 mechanically connecting the pocket plate 246 and notch plate 258 and correspondingly the case 230 to the carrier 202 in one direction of rotation. The first locking structure 276 enables torque transmission from the case 230 to the carrier 202 in one direction only; while allowing relative rotation between the 230 and carrier 202 in the opposite direction.

In the present example, the first locking structure 276 is a one-way or overrunning clutch, for example, a passive one-way clutch wherein the strut 280 constantly extends from the pocket 272. The strut 280, and correspondingly the first one-way clutch or first locking structure 276, is always deployed, creating a drive connection between rotating components, for example, the case 230 and carrier 202, when their relative rotation is in one direction and overrunning when relative rotation is in the opposite direction and producing a drive connection when their relative rotation is in one direction and overrunning when their relative rotation is in the same direction, the driven member rotates faster than the drive member. The one-way clutch imposes torque in one direction and overruns in the opposite direction. The overrun state effectively or passively disconnects the case 230 and the carrier 202 and correspondingly disconnects the drive or power source from the wheels.

In some aspects, the second locking structure 278 is like the first locking structure 276. For example, the second locking structure 278 includes a locking element, the strut 284, in a pocket 273 of the plate-like member or pocket plate 246 connected to the ring gear 238. A resilient member or return spring 286 positioned in the pocket 273 between the pocket plate 246 and the strut 284 applies a force on the strut 284 urging it inward into the pocket 273, wherein the strut 284 is at or below the side surface or face 274 of the pocket plate 246. The second locking structure 278 utilizes the same notches 270 in the second side surface or face 266 of the notch plate 258 as the first locking structure 276.

As illustrated, the second locking structure 278 includes an active locking element; for example, the strut 284, in the pocket 273 of the pocket plate 246. The pocket plate 246 is connected to the ring gear 238, forming part of the case 230. The strut 284 moves between a deployed position and a non-deployed position. In an active assembly, an actuator assembly, generally indicated at 300, acts on an actuation spring 294 that engages and moves the strut 284, in the pocket 273 of the pocket plate 246, between a non-deployed position—the strut 284 in the pocket 273 and a deployed position—the strut 284 extending outwardly from the pocket 273 and beyond or past the side surface or face 274 of the plate-like member or pocket plate 246.

Because the side surface or face 274 of the pocket plate 246 and the second side surface or face 266 of the notch plate 258 are in close-spaced opposition when the strut 284 moves to the deployed position the strut 284 engages a notch 270 in the second side surface or face 266 of the notch plate 258, mechanically connecting the pocket plate 246 and notch plate 258 and correspondingly the case 230 to the carrier 202 in one direction of rotation. The second locking structure 278 enables torque transmission from the case 230 to the carrier 202 in one direction only; while allowing relative rotation between the 230 and carrier 202 in the opposite direction.

The non-deployed position is characterized by non-abutting engagement of a locking strut 284 with a load-bearing shoulder of a notch 270 of the notch plate 258. The engaged position is characterized by the abutting engagement of a locking strut 284 with a load-bearing surface of the corresponding pocket 272 of pocket plate 246 and a load-bearing shoulder of a notch 270 of notch plate 258.

The side surface or face 274 of the pocket plate 246 includes spaced first pockets 272 and spaced second pockets 273. The spaced first and second pockets 272, 273 are associated with a direction of rotation or a direction of vehicle movement-forward or reverse. As shown, both the spaced first pockets 272 and spaced second pockets 273, housing the respective first and second struts 280, 284 of the first locking structure 276 and second locking structure 278 are in the same side surface or face 274 of the pocket plate 246. Both the first strut 280 and the second strut 284 extend above the side surface or face 274 of the pocket plate 246.

A plurality of struts 280 and struts 284 are provided. The struts 280 alternating with the struts 284. It is understood that a particular number of each strut may be provided, and a greater or lesser number of struts 284 may be provided.

The notch plate 258 includes a plurality of notches 270, the respective struts 280, 284 of the first and second locking structures 276, 278 engaging the notches 270. Each notch 270 has opposing engagement surfaces 288, 290 at opposite ends of the notch 270. The engagement surface 288 is configured to receive and engage the strut 280 of the first locking structure 276, and the engagement surface 290 is configured to receive and engage the strut 284 of the second locking structure 278. In the present example, both struts 280, 284 act on the same notch 270, on opposite ends of the notch 270. The radial width of the respective strut 280 and the second strut 284 is different, with the passive or overrunning strut, the strut 280 of the first locking structure 276, having a greater width. The notch 270 also includes ramp surfaces 296 on each side forming a narrow portion adjacent the engagement surface 290 associated with the strut 284 of the second locking structure. The ramp surfaces 296 provide side or lateral support for the strut 284 and cooperate with the strut 280 during overrunning.

Figure 11:
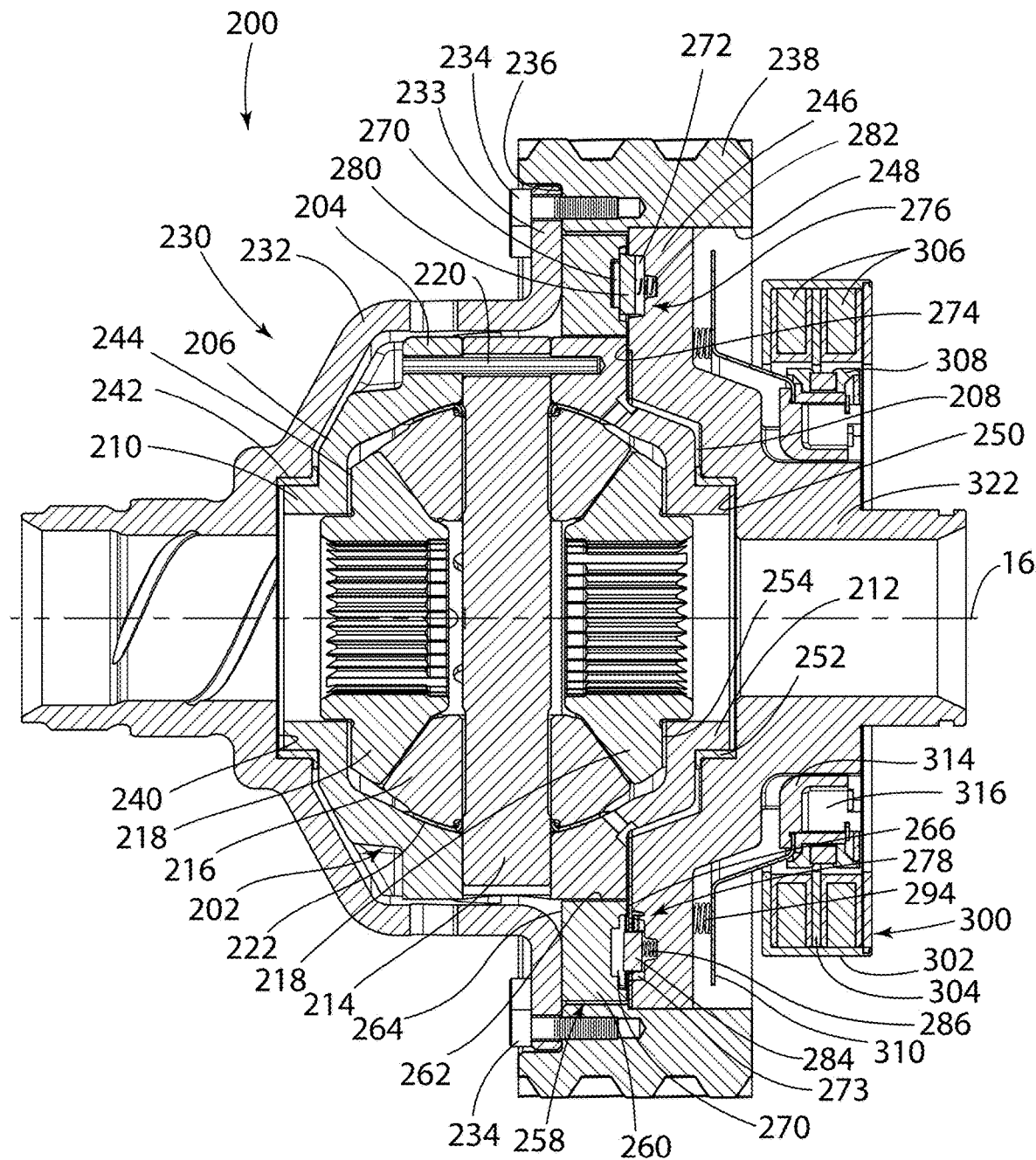
FIG. 11 is a sectional view of the drive component of FIG. 9 illustrating engagement of the first locking structure.

FIG. 11 shows the strut 284 of the second locking structure 278 in the pocket 273 associated with the second locking structure 278 while the strut 280 of the first locking structure 276 engages an engagement surface 288 of the notch 270 whereby torque is transferred in one direction.

Figure 12:
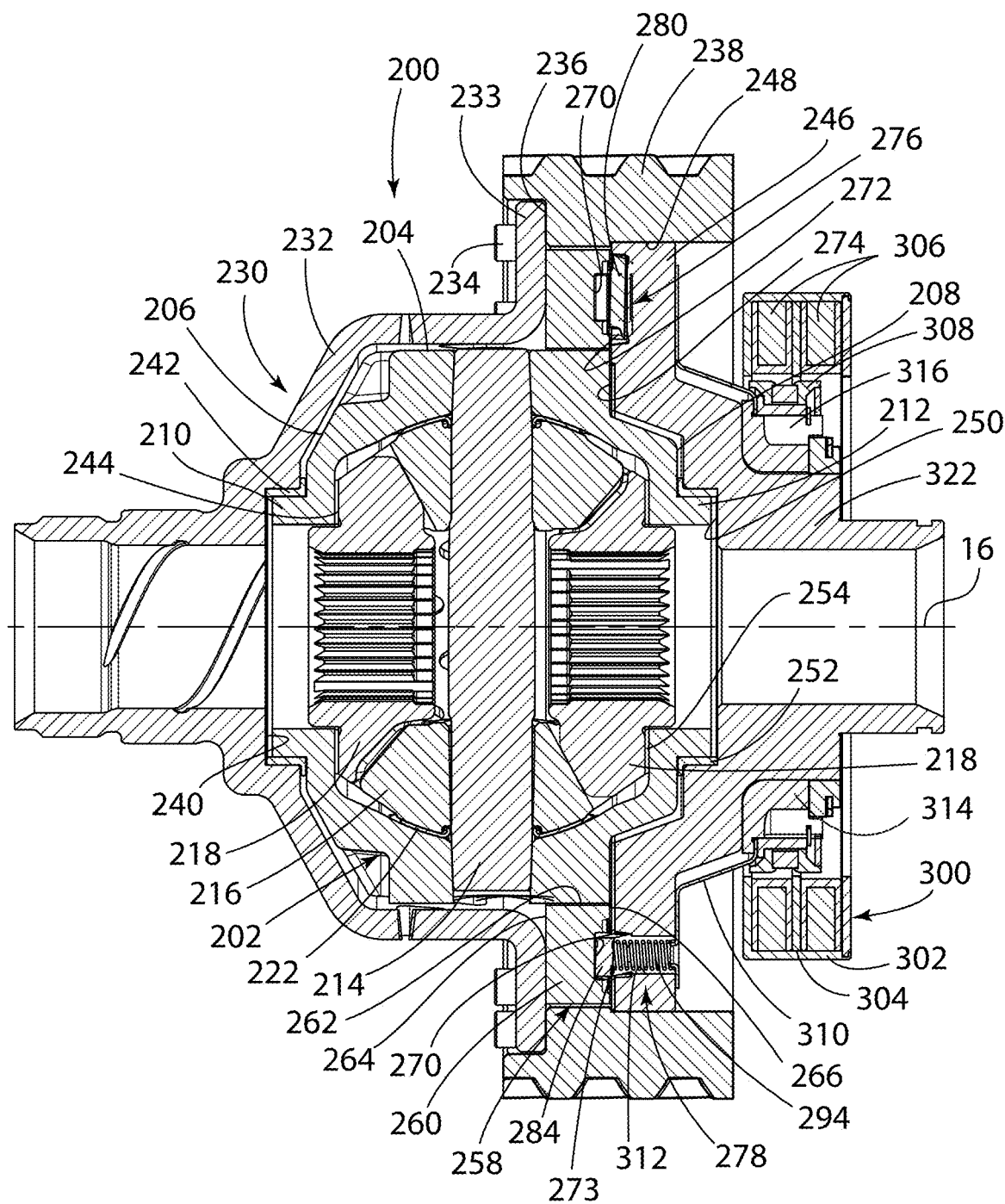
FIG. 12 is a sectional view of the drive component of FIG. 9 illustrating engagement of the second locking structure.

FIG. 12 shows the strut 284 of the second locking structure 278 extending from the pocket 273 associated with the second locking structure 278, wherein the strut 284 of the second locking structure 278 engages the opposite engagement surface 290 of the notch 270 and torque is transferred in the opposite direction. When torque is transferred in the opposite direction, the strut 280 of the first locking structure 276 is placed in an overrun condition.

The notches 270 cooperate with the struts 280 of the first locking structure 276 to lock the notch plate 258 to the pocket plate 246 in one direction about the axis 16 while allowing free-wheeling in the opposite direction about the axis 16. In like fashion, the notches 270 allow the struts 284 of the second locking structure 278 to lock the notch plate 258 to the pocket plate 246 in the opposite direction about the axis 16.

While the notches 270 cooperate with the first and second locking structures 276, 278, two sets of notches could be formed in the notch plate 258, one set cooperating with the first locking structure and the second set cooperating with the second locking structure. The notches could be radially spaced at different radial distances from the center of the notch plate 258.

The notches 270 are formed on only one side of the notch plate 258, and the pockets 272, 273 associated with the first and second locking structures 276, 278 are formed on only one side of the pocket plate 246. The respective second side surface or face 266 of the notch plate, having the notches 270, is positioned adjacent to and in a close-spaced relationship with the side surface or face 274 of the pocket plate 246.

Figure 13:
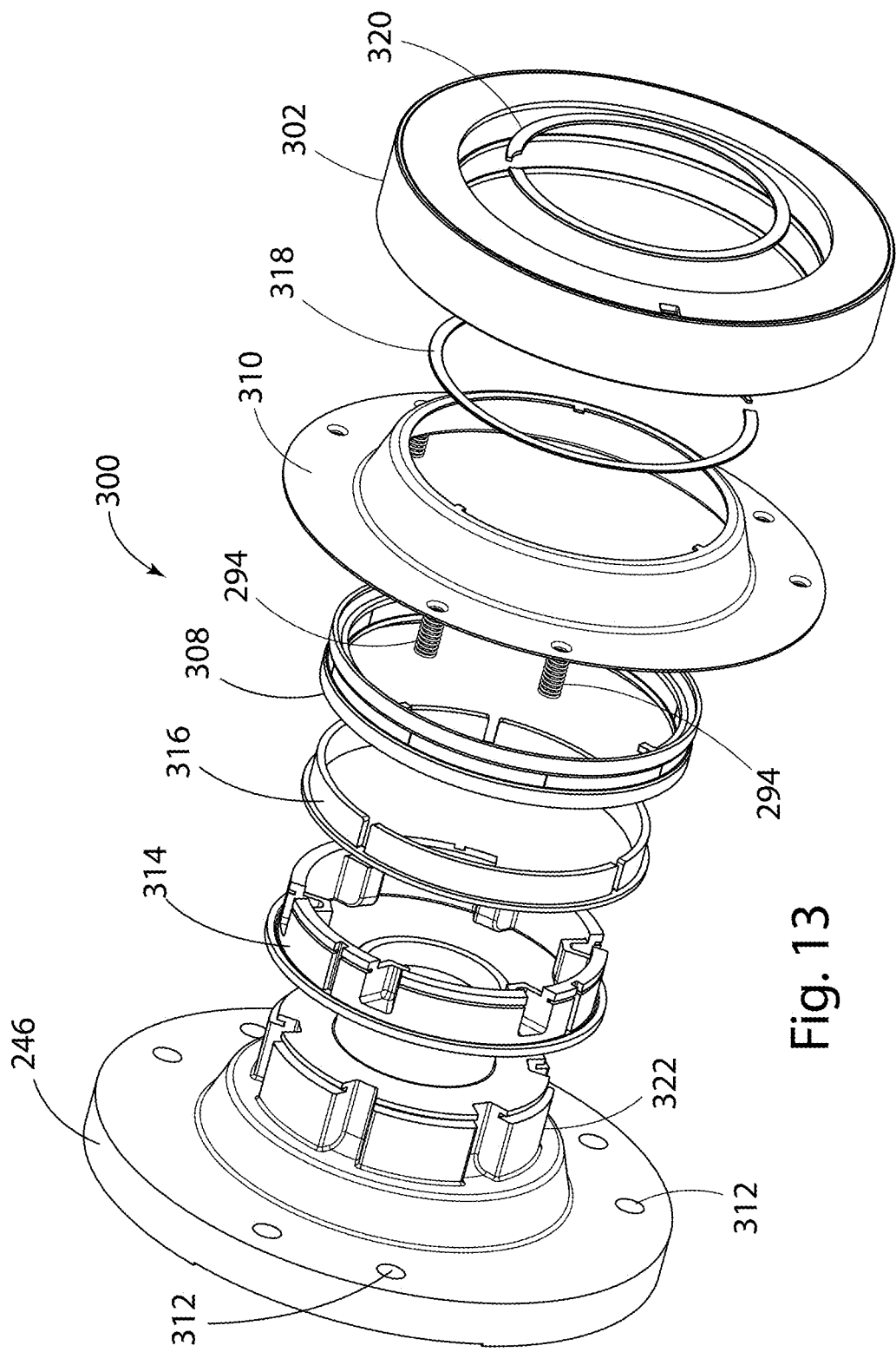
FIG. 13 is an exploded, partial perspective view taken from the right-hand side of an actuation mechanism for use with the drivetrain component of FIG. 9.

FIG. 13 shows, like the previous example, an actuator 300 for use with the drivetrain component 200. The stator structure 302 includes a ferromagnetic housing 304 with spaced apart fingers and electromagnetically inductive coils 306 housed between adjacent fingers. As shown in FIGS. 11 and 12, the stator structure 302 has two electromagnetically inductive coils 306 to create a magnetic flux when one or both electromagnetically inductive coils 306 are energized. The stator structure 302 applies a first magnetic control force to the translator one way when the electromagnetically inductive coils 306 are energized to cause the translator 308 to move along the rotational axis 16. The translator 308 reacts to the magnetic control force and moves the spring plate 310 and corresponding actuation springs 294 along the rotational axis 16. By reversing the current direction in the electromagnetically inductive coils 306, the translator structure 308 causes the spring plate 310 and corresponding actuation springs 294 to move in the opposite direction along the rotational axis 16.

The translator structure 308 is configured for operation with the pocket plate 246 and rotates with the pocket plate 246. The translator structure 308 is supported for rotation relative to the housing by a hub portion 322 of the pocket plate 246. Each actuation spring 294 of the second locking structure 278 has a free end portion adapted to move within a passage 312 and engage the strut 284 of the second locking structure 278. The actuator 300 includes a translator hub 314, a spacer 316, and snap rings 318, 320.

The translator structure 308 moves upon receiving a net translational magnetic force which moves the translator structure 308 linearly and correspondingly, the actuation springs 294 within their passages 312. The translator structure 308 is operatively connected to the actuation springs 294 via the spring plate 310 to linearly move the actuation springs 294 in unison. The selective bi-directional shifting movement of the translator structure 308 is along the rotational axis 16, between a first position corresponding to a first mode of the drivetrain component 200 and a second position corresponding to a second mode of the drivetrain component 200. The first and second operating modes may be a locked mode and an unlocked-free-wheeling mode.

While exemplary embodiments are described above, it is not intended these embodiments describe all possible forms of the present invention. Rather, the words used in the specification are words of description rather than limitation. It is understood that various changes may be made without departing from the spirit and scope of the present invention. Additionally, the features of various implementing embodiments may be combined to form further embodiments of the present invention.

The description of the invention is merely exemplary in nature; thus, variations that do not depart from the gist of the invention are intended to be within the scope of the invention. Such variations are not to be regarded as a departure from the spirit and scope of the invention.

What is claimed is:

1. A drivetrain component comprising:
a coupling member rotating about a central axis and including a coupling member coupling face;
a rotatable member rotating about the central axis and including a rotatable member coupling face having locking abutments;
the coupling member coupling face and the rotatable member coupling face being in close-spaced opposition;
a first locking structure selectively mechanically coupling the coupling member to the rotatable member;
a second locking structure selectively mechanically coupling the coupling member to the rotatable member;
both the first locking structure and the second locking structure on the coupling member coupling face wherein the first locking structure engages one of the locking abutments in the rotatable member coupling face and the second locking structure engages another one of the locking abutments in the rotatable member coupling face; and
an actuator to actively control one operating mode of the drivetrain component by actuating the second locking structure for selective locking structure movement between the coupling member coupling face and the rotatable member coupling face, wherein the first locking structure passively controls an operating mode of the drivetrain component such that the rotatable member coupling face overruns the coupling member coupling face.

2. The drivetrain component of claim 1 including:
a carrier, the carrier including a differential gear set; and
the rotatable member connected to the carrier.

3. The drivetrain component of claim 2 including:
a case surrounding the carrier, the coupling member connected to the case.

4. The drivetrain component of claim 1 including:
each locking abutment includes a first engagement surface and a second engagement surface; and the first locking structure engaging the first engagement surface and the second locking structure engaging the second engagement surface.

5. The drivetrain component of claim 3 wherein the locking abutments are notches.

6. The drivetrain component of claim 5 wherein:
each notch has opposed engagement surfaces.

7. A drivetrain component comprising:
a coupling member rotating about a central axis and including a coupling member coupling face;
a rotatable member rotating about the central axis and including a rotatable member coupling face having locking abutments;
the coupling member coupling face and the rotatable member coupling face being in close-spaced opposition;
a first locking structure selectively mechanically coupling the coupling member to the rotatable member;
a second locking structure selectively mechanically coupling the coupling member to the rotatable member;
both the first locking structure and the second locking structure on the coupling member coupling face wherein the first locking structure engages one of the locking abutments in the rotatable member coupling face and the second locking structure engages another one of the locking abutments in the rotatable member coupling face;
the first locking structure includes a passive one-way clutch;
the second locking structure includes an active one-way clutch; and
both the first locking structure and the second locking structure are on the coupling member coupling face.

8. A drivetrain component comprising:
a coupling member rotating about a central axis and including a coupling member coupling face;
a rotatable member rotating about the central axis and including a rotatable member coupling face having locking abutments;
the coupling member coupling face and the rotatable member coupling face being in close-spaced opposition;
a first locking structure selectively mechanically coupling the coupling member to the rotatable member;
a second locking structure selectively mechanically coupling the coupling member to the rotatable member;
both the first locking structure and the second locking structure on the coupling member coupling face wherein the first locking structure engages one of the locking abutments in the rotatable member coupling face and the second locking structure engages another one of the locking abutments in the rotatable member coupling face;
the first locking structure is always in a deployed position; and
an actuator, the actuator moving the second locking structure to one of a deployed position and a non-deployed position.

9. A drivetrain component comprising:
a coupling member rotating about a central axis and including a coupling member coupling face;
a rotatable member rotating about the central axis and including a rotatable member coupling face having locking abutments;
the coupling member coupling face and the rotatable member coupling face being in close-spaced opposition;

a first locking structure selectively mechanically coupling the coupling member to the rotatable member;

a second locking structure selectively mechanically coupling the coupling member to the rotatable member;

both the first locking structure and the second locking structure on the coupling member coupling face wherein the first locking structure engages one of the locking abutments in the rotatable member coupling face and the second locking structure engages another of the locking abutments in the rotatable member coupling face; and wherein the first locking structure mechanically couples the coupling member to the rotatable member in a first direction of rotation and the rotatable member overruns the coupling member in the first direction of rotation and the second locking structure selectively couples the coupling member to the rotatable member in a second direction of rotation.

10. The drivetrain component of claim 9 includes:

a first operating mode wherein a locking element of the second locking structure is in a nondeployed position; and a second operating mode wherein the locking element of the second locking member is in a deployed position.

11. The drivetrain component of claim 10 includes:

a locking element of the first locking structure is in a deployed position in both the first and second operating mode.

12. The drivetrain component of claim 10 wherein:

the coupling member includes a case;

the rotatable member includes a carrier supported by the case, the carrier rotatable about the central axis relative to and independent of the case, the carrier including a differential gear set;

the first locking structure selectively mechanically coupling the case to the carrier, the first locking structure including a pocket in the coupling member and a locking element disposed in the pocket;

the second locking structure selectively mechanically coupling the case to the carrier, the second locking structure including a pocket in the coupling member and the locking element disposed in the pocket; and both the first locking structure and the second locking structure on the coupling member coupling face such that the locking element of the first locking structure engages one of the locking abutments in the rotatable member coupling face and the locking element of the second locking structure engages another one of the locking abutments in the rotatable member coupling face.

13. The drivetrain component of claim 9 wherein:

the first locking structure includes a passive one-way clutch; and the second locking structure includes an active one-way clutch.

* * * * *